United States Patent
Takeshige

(10) Patent No.: US 10,417,302 B2
(45) Date of Patent: Sep. 17, 2019

(54) PARALLEL COMPUTER, PARALLEL LU-FACTORIZATION METHOD, AND PARALLEL LU-FACTORIZATION PROGRAM

(71) Applicant: FUJITSU LIMITED, Kawasaki-shi, Kanagawa (JP)

(72) Inventor: Kazuaki Takeshige, Numazu (JP)

(73) Assignee: FUJITSU LIMITED, Kawasaki (JP)

(*) Notice: Subject to any disclaimer, the term of this patent is extended or adjusted under 35 U.S.C. 154(b) by 12 days.

(21) Appl. No.: 15/361,887

(22) Filed: Nov. 28, 2016

(65) Prior Publication Data
US 2017/0242826 A1    Aug. 24, 2017

(30) Foreign Application Priority Data
Feb. 23, 2016   (JP) ................. 2016-032299

(51) Int. Cl.
G06F 17/16    (2006.01)
G06F 17/12    (2006.01)

(52) U.S. Cl.
CPC .............. G06F 17/16 (2013.01); G06F 17/12 (2013.01)

(58) Field of Classification Search
CPC ....................................... G06F 17/16
USPC ................................ 708/514, 520
See application file for complete search history.

(56) References Cited

U.S. PATENT DOCUMENTS

| | | | |
|---|---|---|---|
| 5,887,186 A | 3/1999 | Nakanishi | |
| 8,296,350 B2* | 10/2012 | Li | G06F 17/16 708/200 |
| 2004/0193841 A1* | 9/2004 | Nakanishi | G06F 17/16 712/10 |
| 2009/0292758 A1* | 11/2009 | Brokenshire | G06F 17/16 708/607 |
| 2011/0161976 A1* | 6/2011 | Alexander | G06F 9/5066 718/104 |
| 2017/0046307 A1* | 2/2017 | Lvov | G06F 17/16 |

FOREIGN PATENT DOCUMENTS

| | | |
|---|---|---|
| JP | 7-152726 | 6/1995 |
| JP | 7-271760 | 10/1995 |

OTHER PUBLICATIONS

K. Vaidyanathan, et al., Improving Communication Performance and Scalability of Native Applications on Intel Xeon Phi Coprocessor Clusters, 2014 IEEE 28th International Parallel & Distributed Processing Symposium, 2014, 1084-1092.*
W. Liu, et. al., Utilizing the Power of High-Performance Computing, IEEE Signal Processing Magazine 1998, p. 85-100.*

* cited by examiner

*Primary Examiner* — Andrew Caldwell
*Assistant Examiner* — Emily E Larocque
(74) *Attorney, Agent, or Firm* — Staas & Halsey LLP

(57) ABSTRACT

A parallel LU-factorization method executed in a parallel computer including a plurality of processing nodes which execute LU-factorization in parallel, the method causes each of the plurality of processing nodes to execute processing of; measuring a first time period, which is a time period from when a matrix product for a matrix of a first size is completed to when communication with a different processing node out of the plurality of processing nodes is completed; and altering a size of a matrix to be used for a matrix product to a second size smaller than the first size in a case where the measured first time period is equal to or longer than a predetermined time period.

7 Claims, 29 Drawing Sheets

FIG. 9

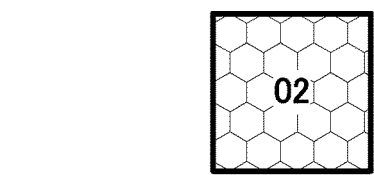
$C_j^{22} \leftarrow C_j^{22} - L_j^{20} U_j^{02}$
FIG. 28A
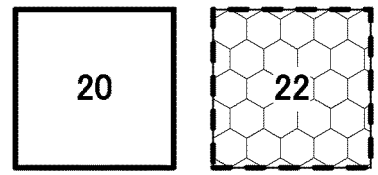
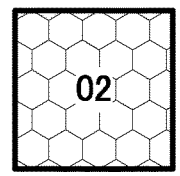
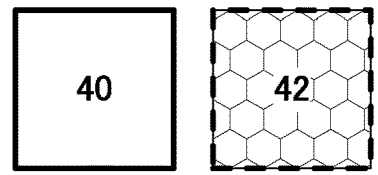
$C_j^{42} \leftarrow C_j^{42} - L_j^{40} U_j^{02}$
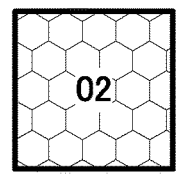
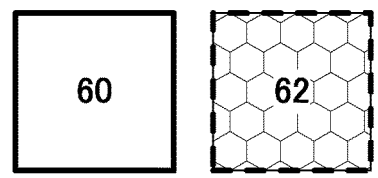
$C_j^{62} \leftarrow C_j^{62} - L_j^{60} U_j^{02}$

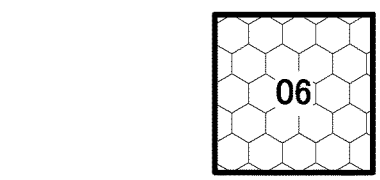
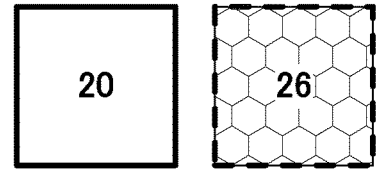
$$C_j^{26} \leftarrow C_j^{26} - L_j^{20} U_j^{06}$$
FIG. 28B
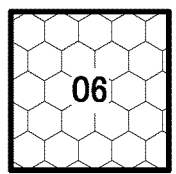
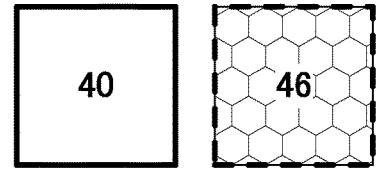
$$C_j^{46} \leftarrow C_j^{46} - L_j^{40} U_j^{06}$$
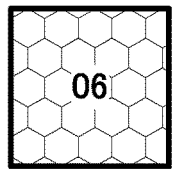
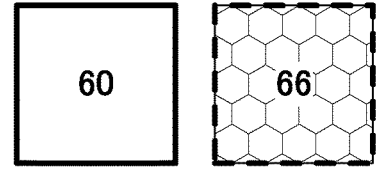
$$C_j^{66} \leftarrow C_j^{66} - L_j^{60} U_j^{06}$$

FIG. 29A
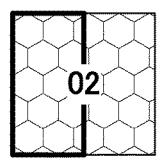 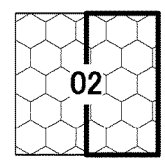
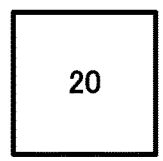 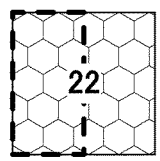    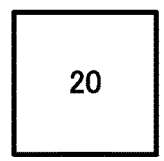 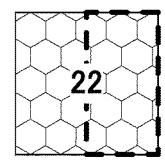
$C_j^{22(1)} \leftarrow C_j^{22(1)} - L_j^{20} U_j^{02(1)}$    $C_j^{22(2)} \leftarrow C_j^{22(2)} - L_j^{20} U_j^{02(2)}$
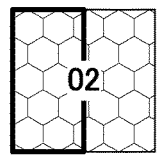 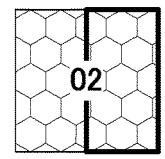
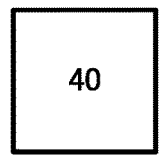 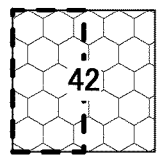    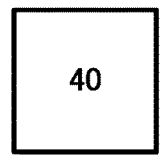 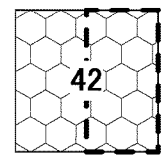
$C_j^{42(1)} \leftarrow C_j^{42(1)} - L_j^{40} U_j^{02(1)}$    $C_j^{42(2)} \leftarrow C_j^{42(2)} - L_j^{40} U_j^{02(2)}$
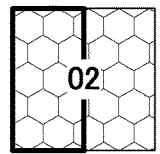 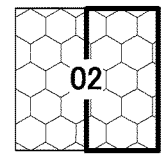
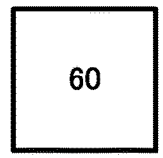 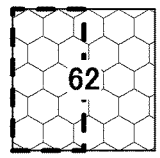    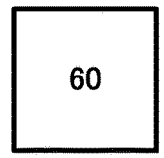 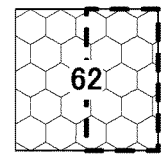
$C_j^{62(1)} \leftarrow C_j^{62(1)} - L_j^{60} U_j^{02(1)}$    $C_j^{62(2)} \leftarrow C_j^{62(2)} - L_j^{60} U_j^{02(2)}$ FIG. 29B
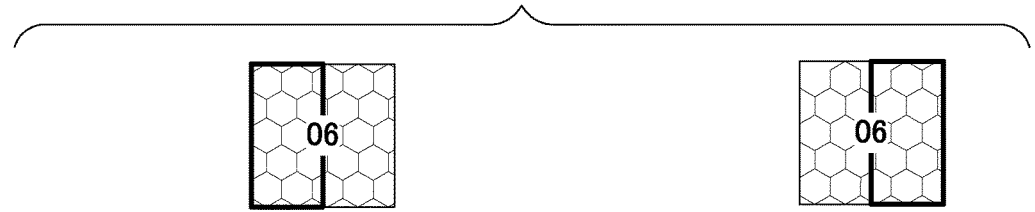
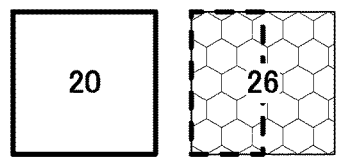
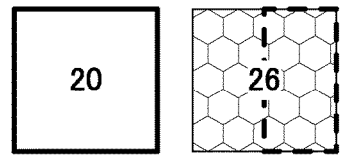
$C_j^{26(1)} \leftarrow C_j^{26(1)} - L_j^{20} U_j^{06(1)}$
$C_j^{26(2)} \leftarrow C_j^{26(2)} - L_j^{20} U_j^{06(2)}$
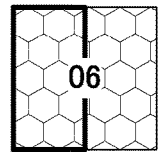
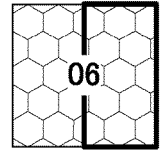
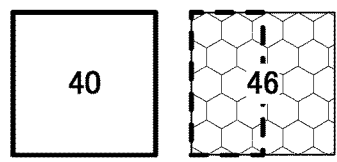
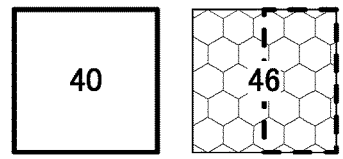
$C_j^{46(1)} \leftarrow C_j^{46(1)} - L_j^{40} U_j^{06(1)}$
$C_j^{46(2)} \leftarrow C_j^{46(2)} - L_j^{40} U_j^{06(2)}$
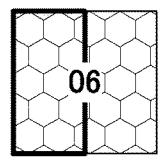
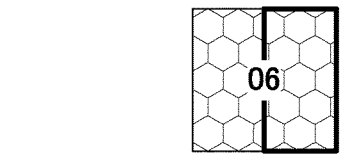
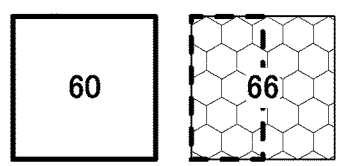
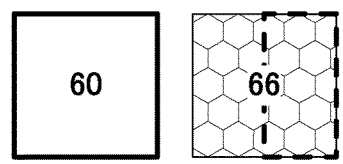
$C_j^{66(1)} \leftarrow C_j^{66(1)} - L_j^{60} U_j^{06(1)}$
$C_j^{66(2)} \leftarrow C_j^{66(2)} - L_j^{60} U_j^{06(2)}$

PARALLEL COMPUTER, PARALLEL LU-FACTORIZATION METHOD, AND PARALLEL LU-FACTORIZATION PROGRAM

CROSS-REFERENCE TO RELATED APPLICATION

This application is based upon and claims the benefit of priority of the prior Japanese Patent Application No. 2016-032299, filed on Feb. 23, 2016, the entire contents of which are incorporated herein by reference.

FIELD

The embodiment discussed herein is related to a parallel computing technique.

BACKGROUND

An attempt to solve a problem appearing in physics by formulation and numerical computation often ends up solving simultaneous linear equations. The LINPACK benchmark is known as a benchmark for measuring the computational performance of a computer system for solving simultaneous linear equations as above. Since the LINPACK benchmark is used for the ranking on the TOP500 list, attention has been drawn to a technique to solve simultaneous linear equations using a computer system at high speed. Here, LINPACK itself is a software library for performing numerical computations. Particularly, high-performance LINPACK (HPL) is a library for nodes (for example, processes or processor cores) of a parallel computer system to solve simultaneous linear equations for a dense matrix in parallel.

In the computation of simultaneous linear equations Ax=b, the matrix A is first factorized into an upper triangular matrix and a lower triangular matrix (this factorization is called the LU factorization), and then x is obtained. For this reason, if shortening of the processing time of LU-factorization is achieved, it is possible to shorten the time taken to solve simultaneous linear equations. An example of the related conventional technique is disclosed in, for example, Japanese Laid-open Patent Publication No. 07-271760.

In one aspect, an object of the present disclosure is to provide a technique for shortening processing time of LU-factorization by a parallel computer.

SUMMARY

According to an aspect of the invention, a parallel LU-factorization method executed in a parallel computer including a plurality of processing nodes which execute LU-factorization in parallel, the method causes each of the plurality of processing nodes to execute processing of; measuring a first time period, which is a time period from when a matrix product for a matrix of a first size is completed to when communication with a different processing node out of the plurality of processing nodes is completed; and altering a size of a matrix to be used for a matrix product to a second size smaller than the first size in a case where the measured first time period is equal to or longer than a predetermined time period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating divided matrix A;
FIG. 28A is a diagram illustrating an example of the matrix product for each unit block;
FIG. 28B is a diagram illustrating an example of the matrix product for each unit block;
FIG. 29A is a diagram illustrating an example of the matrix product for each unit block;
FIG. 29B is a diagram illustrating an example of the matrix product for each unit block.

DESCRIPTION OF EMBODIMENT

Figure 1:
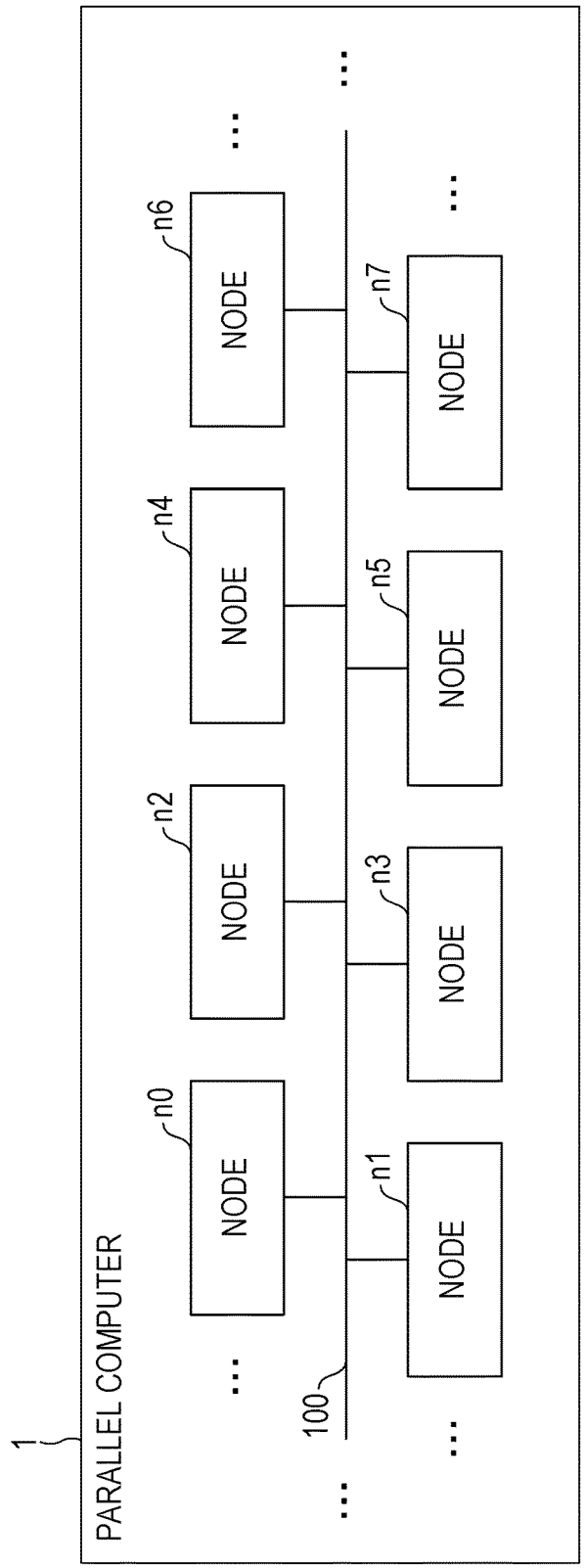
FIG. 1 is a diagram illustrating a configuration of a parallel computer.

FIG. 1 illustrates a configuration of a parallel computer 1 of an embodiment. The parallel computer 1 includes nodes n0 to n7, which are physical processing units. Each of nodes n0 to n7 is connected to an interconnect 100 and exchanges data or the like to be used for computation with another node via the interconnect 100. Nodes n0 to n7 operate together to process a job such as solving simultaneous linear equations, for example. Note that although the number of nodes is 8 in FIG. 1, the number of nodes is not particularly limited.

Figure 2:
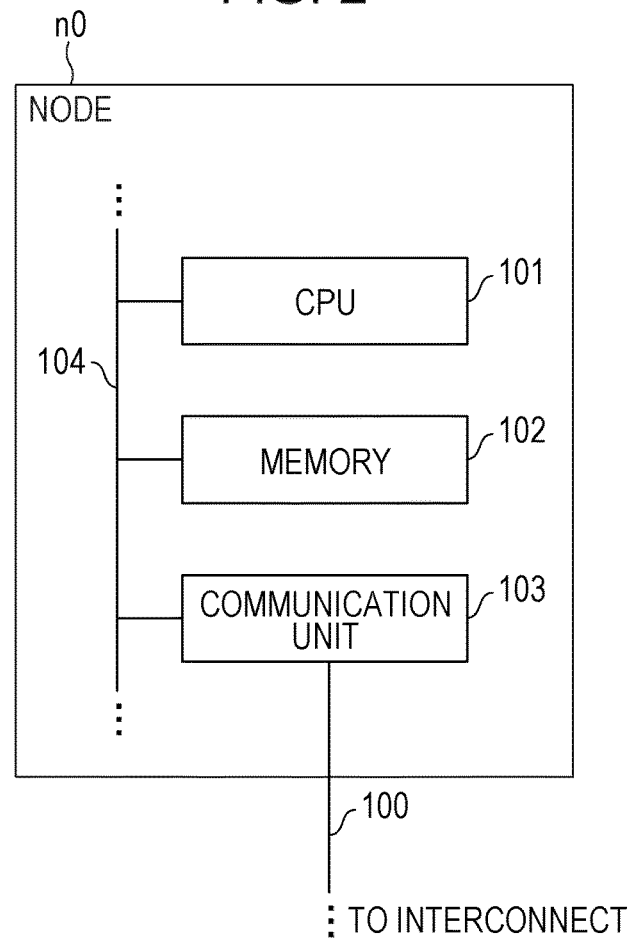
FIG. 2 is a hardware configuration diagram of a node.
Figure 3:
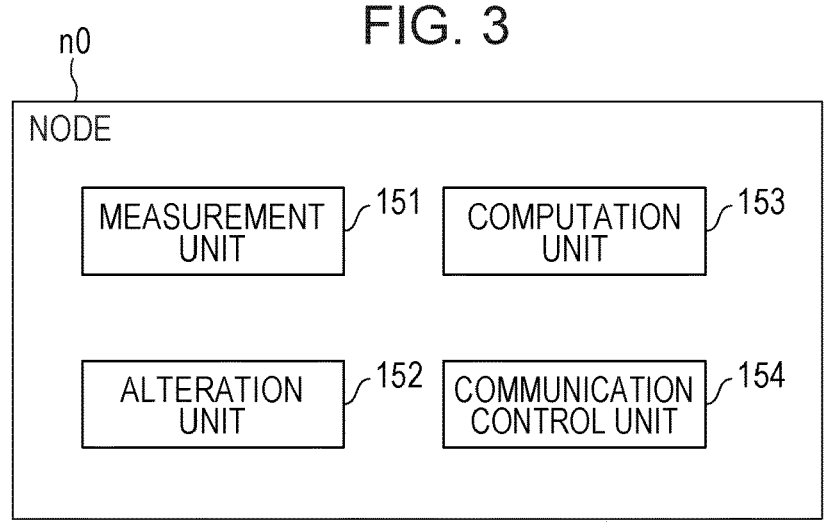
FIG. 3 is a functional block diagram of the node.

FIG. 2 illustrates a hardware configuration diagram of node n0. Node n0 includes a central processing unit (CPU) 101, a memory 102, a communication unit 103, and a bus 104. The CPU 101, the memory 102, and the communication unit 103 are connected to one another via the bus 104. A program for executing processing in the embodiment is loaded onto the memory 102 and executed by the CPU 101 to implement various functions as illustrated in FIG. 3. The communication unit 103 operates independently of the CPU 101 and executes processing of transmitting and receiving data to and from another node. Note that the hardware configuration diagrams of the nodes other than node n0 are the same as the hardware configuration diagram of node n0.

FIG. 3 illustrates a functional block diagram of node n0. Node n0 includes a measurement unit 151, an alteration unit 152, a computation unit 153, and a communication control unit 154. Note that the functional block diagrams of the nodes other than node n0 are the same as the functional block diagram of node n0.

The measurement unit 151 measures a wait time from a point of time at which matrix products are completed to the end of communication. The alteration unit 152 alters the size of a matrix to be used for matrix product computation. The computation unit 153 executes matrix processing (for example, the matrix product computation and the like). The communication control unit 154 controls execution of communication by the communication unit 103 (to be more specific, for example, starts transmission, starts reception, checks transmission completion, and checks reception completion).

Figure 4:
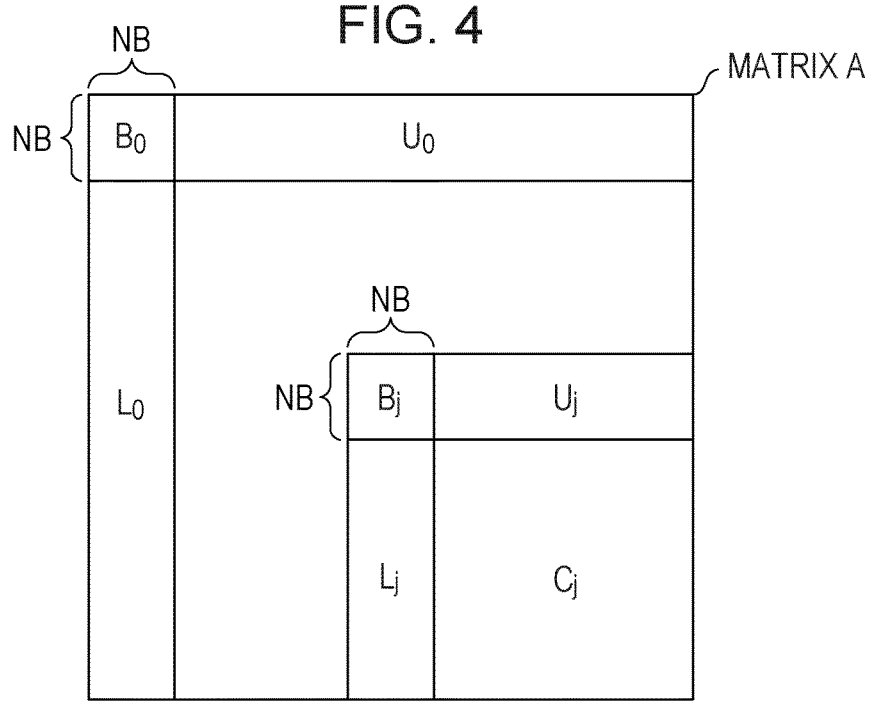
FIG. 4 is a diagram for explaining notation used in an embodiment.

Notation used in the embodiment is described with reference to FIGS. 4 to 6. FIG. 4 illustrates matrix A to be LU-factorized. In the case where matrix A is divided into square blocks each having a width NB, the j-th (j is an integer equal to or greater than 0) block in the diagonal parts is denoted by $B_j$. The column block (also called a column panel) below $B_j$ is denoted by $L_j$, and the row block (also called a row panel) to the right of $B_j$ is denoted by $U_j$. The lower right part enclosed by $L_j$ and $U_j$ is denoted by $C_j$.

Figure 5:
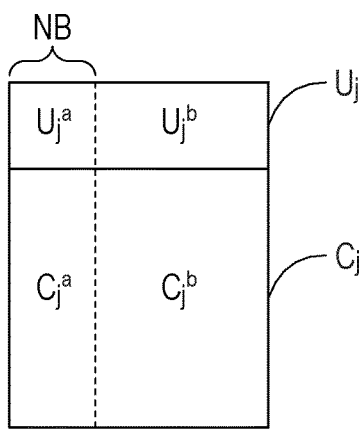
FIG. 5 is a diagram for explaining the notation used in the embodiment.

In addition, as illustrated in FIG. 5, the block on the left end of $U_j$ is denoted by $U_j^a$, and the part of $U_j$ other than $U_j^a$ is denoted by $U_j^b$. The column block on the left end of $C_j$ is denoted by $C_j^a$, and the part of $C_j$ other than $C_j^a$ is denoted by $C_j^b$.

Figure 6:
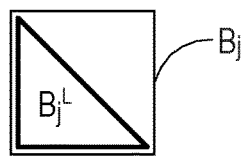
FIG. 6 is a diagram for explaining the notation used in the embodiment.

Also, as illustrated in FIG. 6, the lower triangular matrix of $B_j$ is denoted by $B_j^L$.

Figure 7:
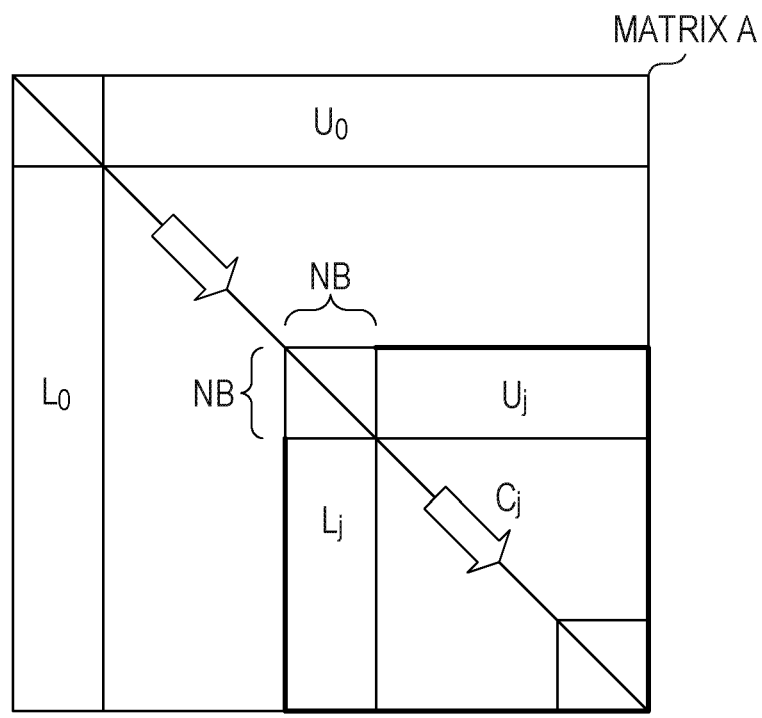
FIG. 7 is a diagram for explaining how LU-factorization proceeds.

In the case of executing LU-factorization, matrix A is divided into blocks each having the width NB and the blocks are allocated to the nodes. Each of the nodes executes the matrix product computation or the like on the allocated blocks. As a whole, LU-factorization proceeds in the direction of the arrows, as illustrated in FIG. 7. Thus, in LU-factorization, communication for exchanging elements of a matrix is executed between nodes.

In order to simplify the description below, consider the case where parallel computation is executed using the eight nodes illustrated in FIG. 1. Then, the process which operates at node n0 is denoted by P0, the process which operates at node n1 by P1, the process which operates at node n2 by P2, the process which operates at node n3 by P3, the process which operates at node n4 by P4, the process which operates at node n5 by P5, the process which operates at node n6 by P6, the process which operates at node n7 by P7.

Figure 8:
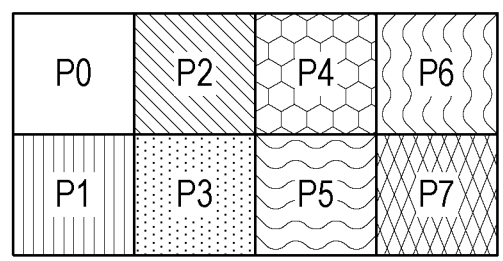
FIG. 8 is a diagram illustrating a process grid.

FIG. 8 illustrates a process grid. As illustrated in FIG. 8, processes P0 to P7 are logically allocated to the two-dimensional process grid. In the example of FIG. 2, eight processes are allocated two-dimensionally in the form of a 2×4 matrix. The blocks of matrix A are cyclically allocated to the processes.

Figure 9:
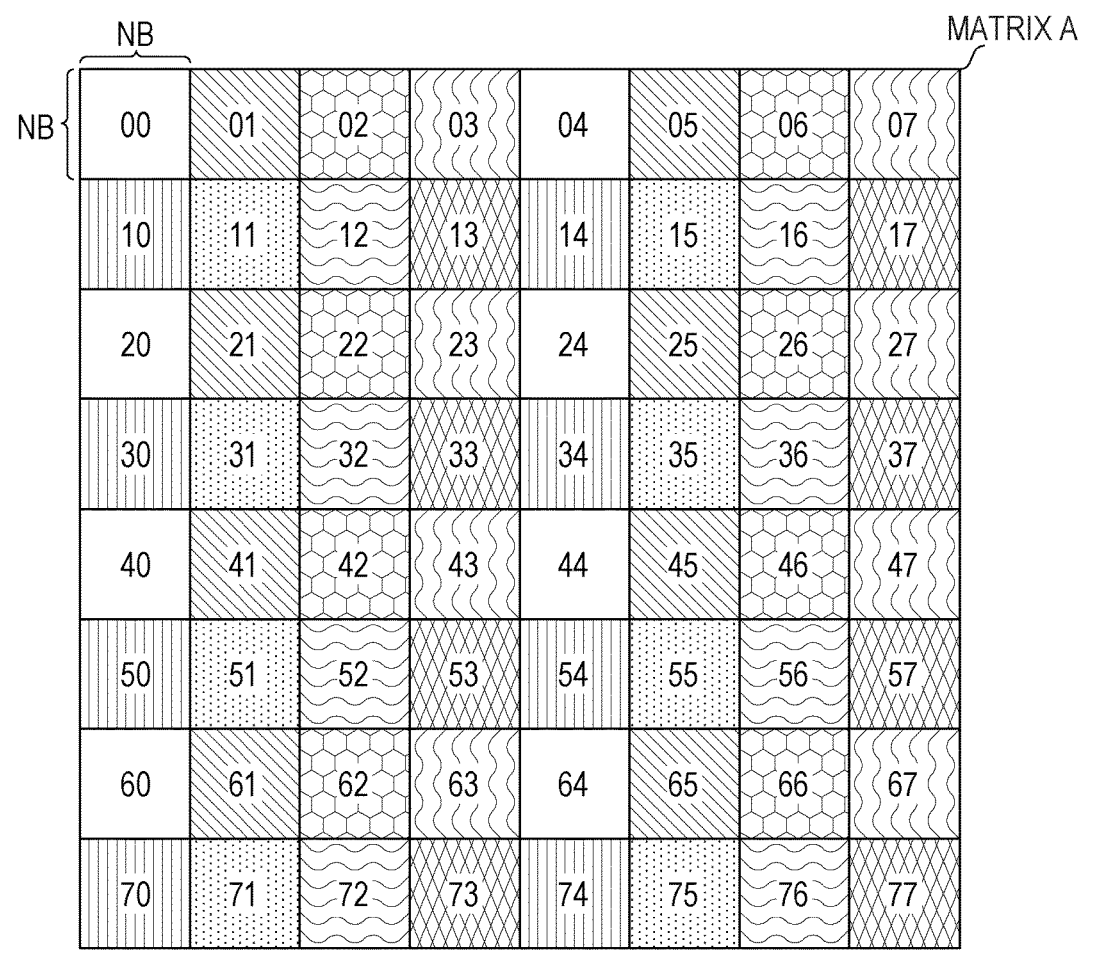

Matrix A is divided as illustrated in FIG. 9 and the blocks are allocated to processes P0 to P7. To be more specific, block 00, block 20, block 40, block 60, block 04, block 24, block 44, and block 64 are allocated to process P0. Block 10, block 30, block 50, block 70, block 14, block 34, block 54, and block 74 are allocated to process P1. Block 01, block 21, block 41, block 61, block 05, block 25, block 45, and block 65 are allocated to process P2. Block 11, block 31, block 51, block 71, block 15, block 35, block 55, and block 75 are allocated to process P3. Block 02, block 22, block 42, block 62, block 06, block 26, block 46, and block 66 are allocated to process P4. Block 12, block 32, block 52, block 72, block 16, block 36, block 56, and block 76 are allocated to process P5. Block 03, block 23, block 43, block 63, block 07, block 27, block 47, and block 67 are allocated to process P6. Block 13, block 33, block 53, block 73, block 17, block 37, block 57, and block 77 are allocated to process P7.

Figure 10:
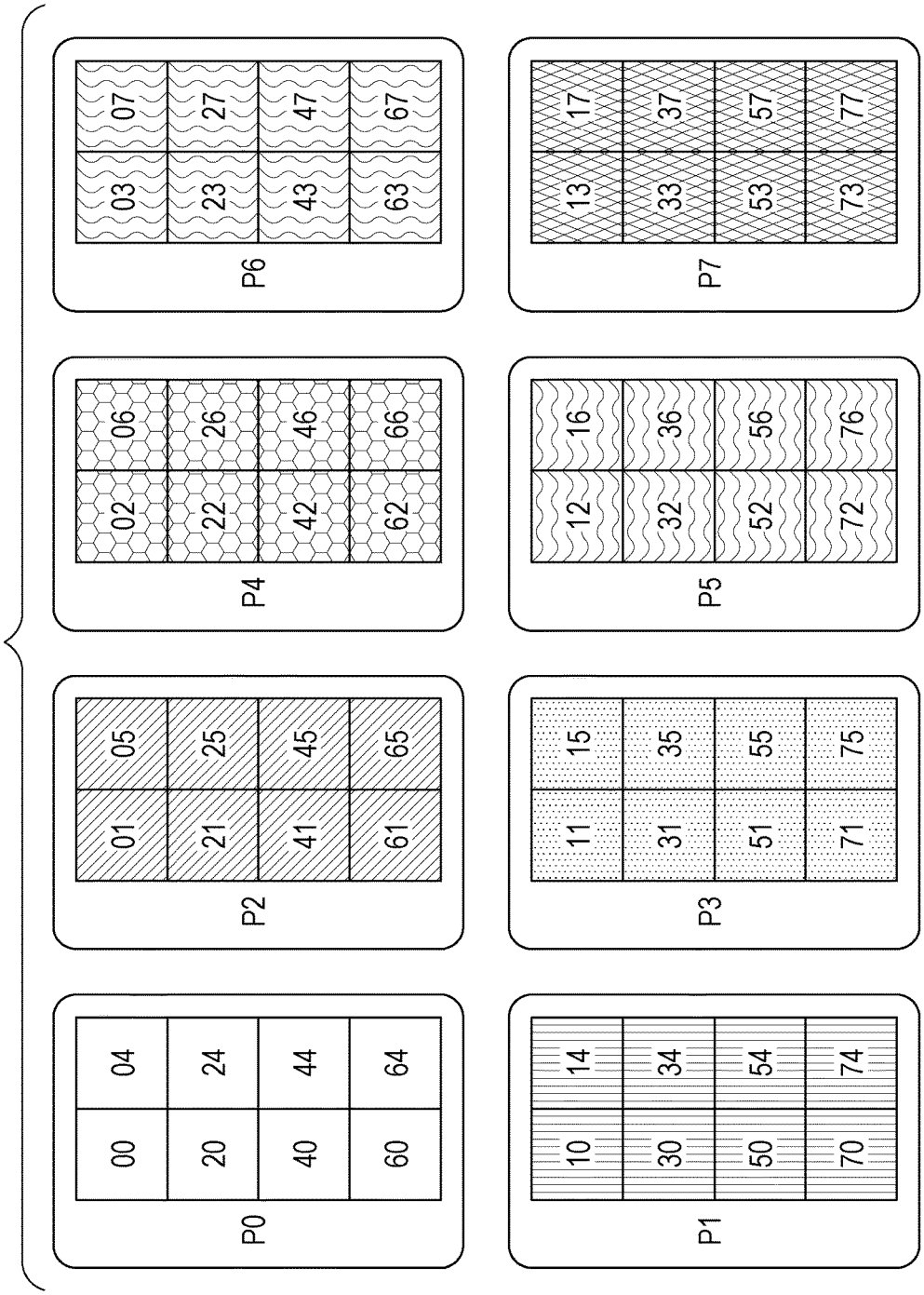
FIG. 10 is a diagram illustrating blocks allocated to processes.

FIG. 10 illustrates the blocks allocated to the processes. Each of the processes executes the matrix processing (for example, the matrix product) using the allocated blocks and blocks received from another process. The allocation as above is performed prior to the start of the parallel computation.

Subsequently, the operation of the parallel computer 1 is described using FIGS. 11 to 32.

Figure 11:
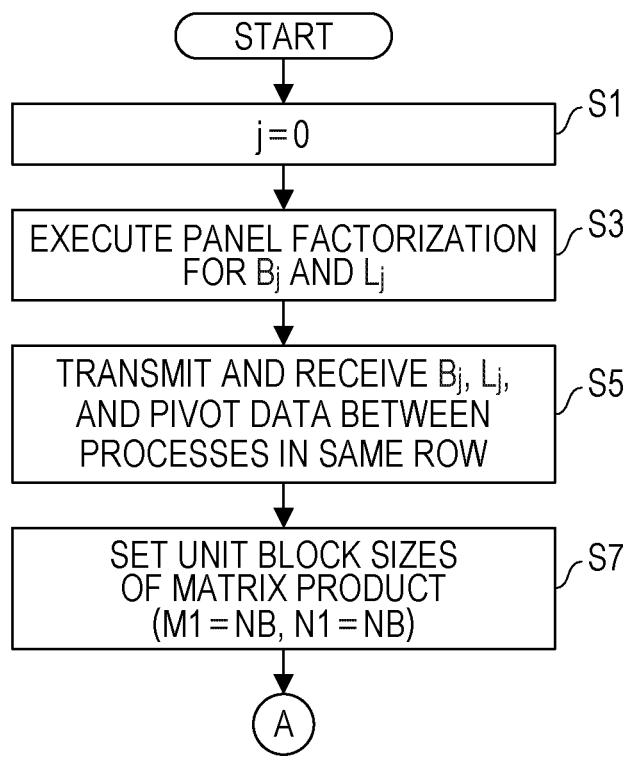
FIG. 11 is a flowchart illustrating processing executed by the parallel computer.

To begin with, the processes of the respective nodes in the parallel computer 1 set a variable j such that j=0, where j is used for identifying the block to be processed (FIG. 11: step S1).

Figure 12:
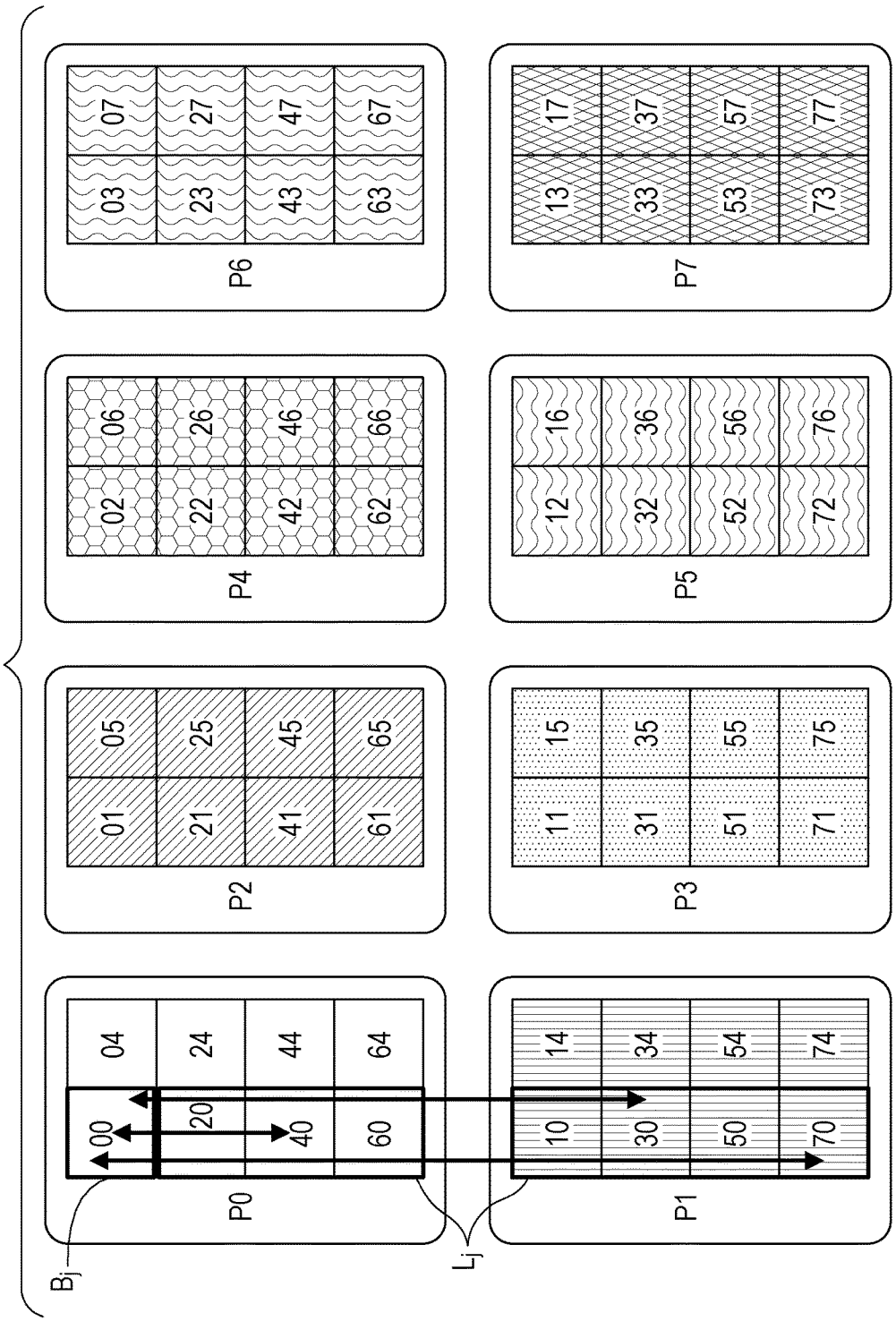
FIG. 12 is a diagram for explaining processing content.

Processes P0 and P1 execute panel factorization for $B_j$ and $L_j$ (step S3). As illustrated in FIG. 12, in panel factorization, process P0 and process P1 execute communication for exchanging rows, and information on pivot row exchange is saved as pivot data, for example. This figure illustrates the case where block 00 makes exchange of rows with three blocks 40, 30, and 70. In addition, delete processing is executed in panel factorization. Since panel factorization is a well-known technique, detailed description thereof is omitted here.

The processes of the respective nodes in the parallel computer 1 transmit and receive $B_j$ and $L_j$ after the processing of step S3 and the pivot data obtained at step S3 to and from the processes in the same row (step S5).

Figure 13:
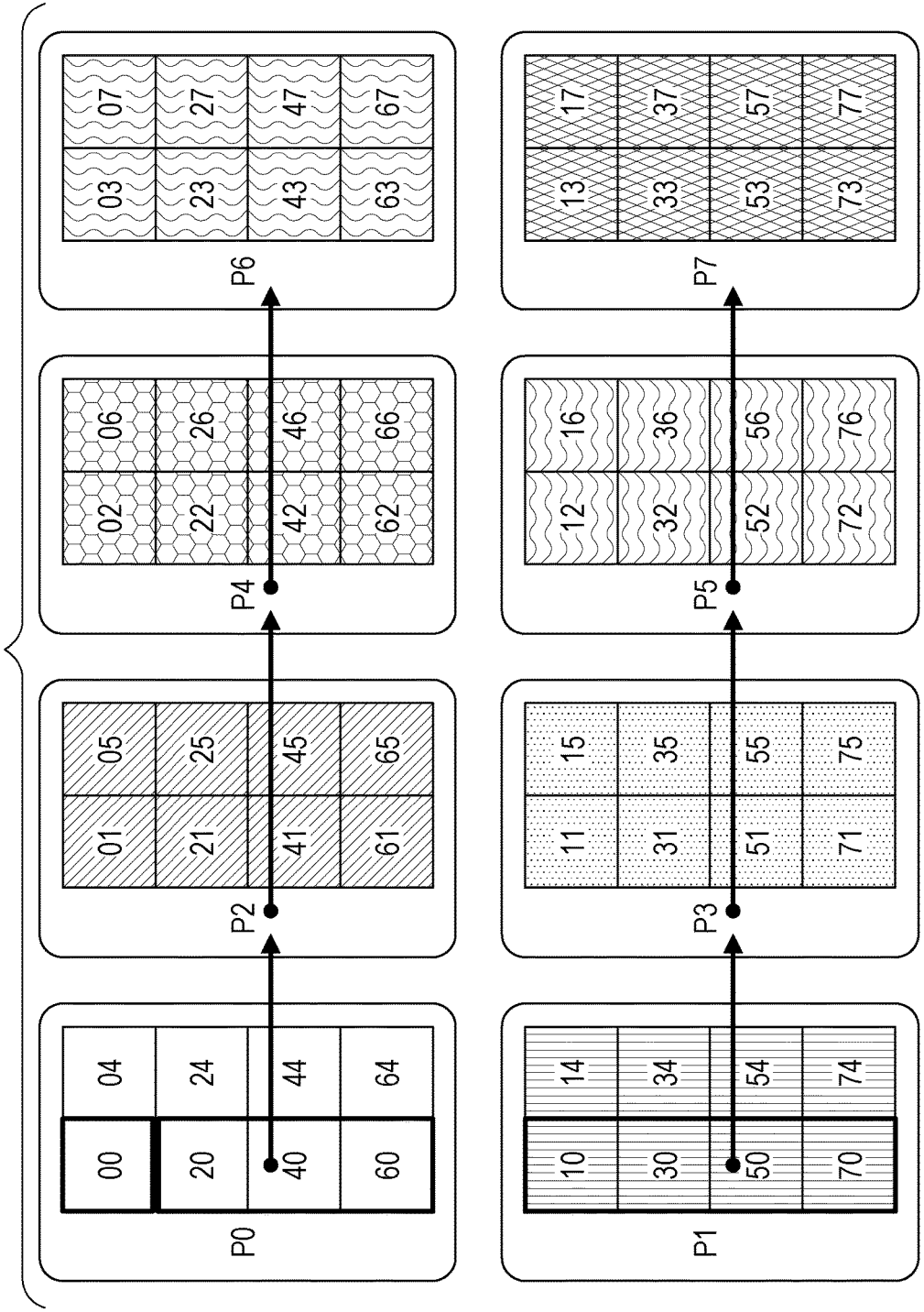
FIG. 13 is a diagram for explaining the processing content.

At step S5, for example, transmission and reception are performed as illustrated in FIG. 13. To be more specific, process P0 performs transmission to process P2, process P2 transmits the data received from process P0 to process P4, process P4 transmits the data received from process P2 to process P6, and process P6 receives the data from process P4. Also, process P1 performs transmission to process P3, process P3 transmits the data received from process P1 to process P5, process P5 transmits the data received from process P3 to process P7, and process P7 receives the data from process P5. Thus, process P0, process P2, process P4, and process P6 retain the pivot data and block 00, block 20, block 40, and block 60. Process P1, process P3, process P5, and process P7 retain the pivot data and block 10, block 30, block 50, and block 70. In HPL, this transmission method is called the increasing-ring.

The processes of the respective nodes in the parallel computer 1 set unit block sizes M1 and N1 for matrix products (step S7). M1 is a block size in a column direction (in other words, an up-down direction) and N1 is a block size in a row direction (in other words, a right-left direction). The block sizes are set taking into consideration the computational performance for matrix products. At step S7, the initial setting is M1=N1=NB. The processing moves on to step S9 of FIG. 14 via terminal A.

Figure 14:
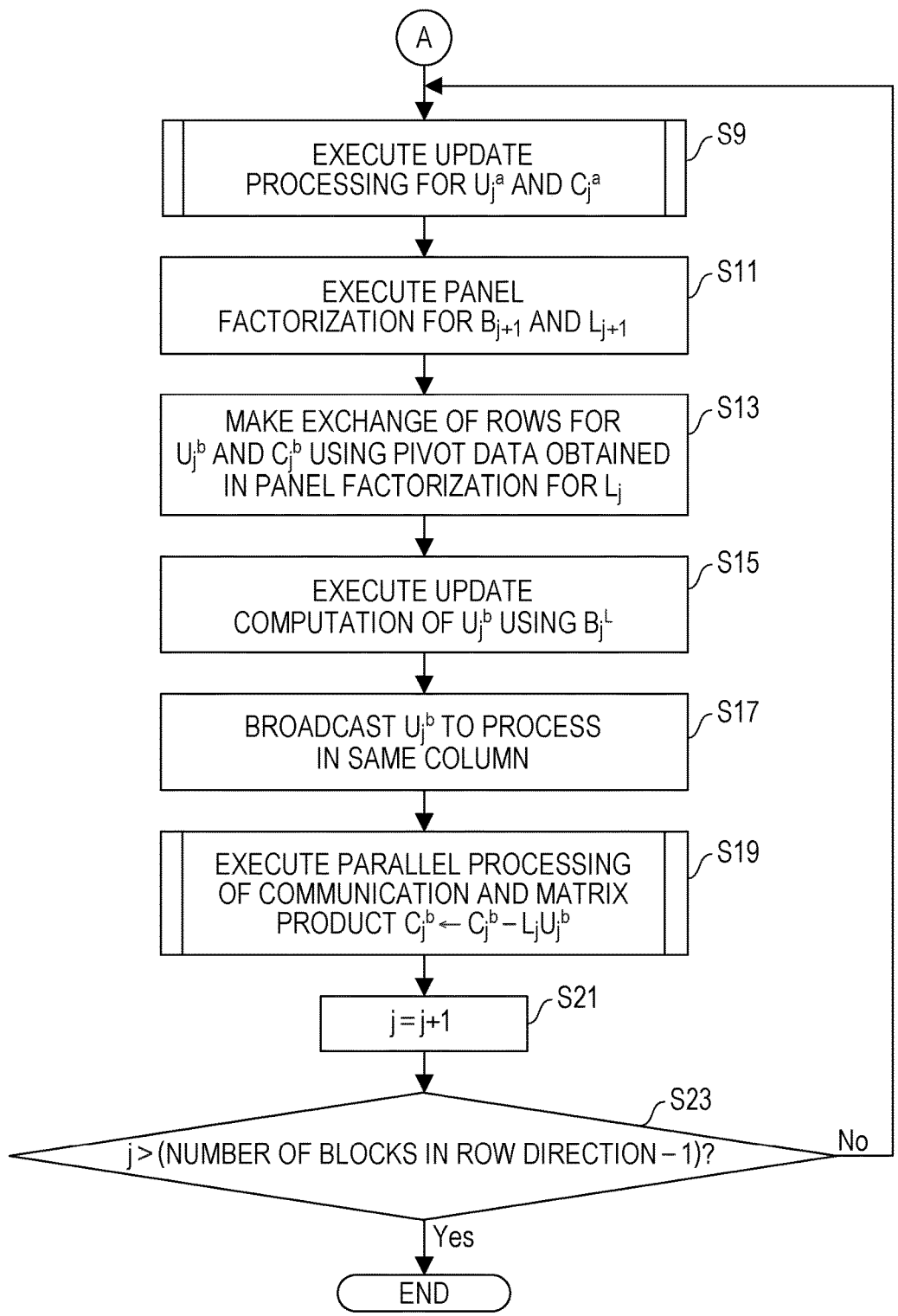
FIG. 14 is a flowchart illustrating the processing executed by the parallel computer.

The description moves on to FIG. 14. Processes P2 and P3, which retain $U_j^a$ and $C_j^a$, execute update processing for $U_j^a$ and $C_j^a$ (FIG. 14: step S9). The update processing for $U_j^a$ and $C_j^a$ is described using FIGS. 15 and 16. Note that the update processing at step S9 is performed as processing at preparation stage for executing panel factorization of $B_{j+1}$ and $L_{j+1}$ at step S11.

Figure 15:
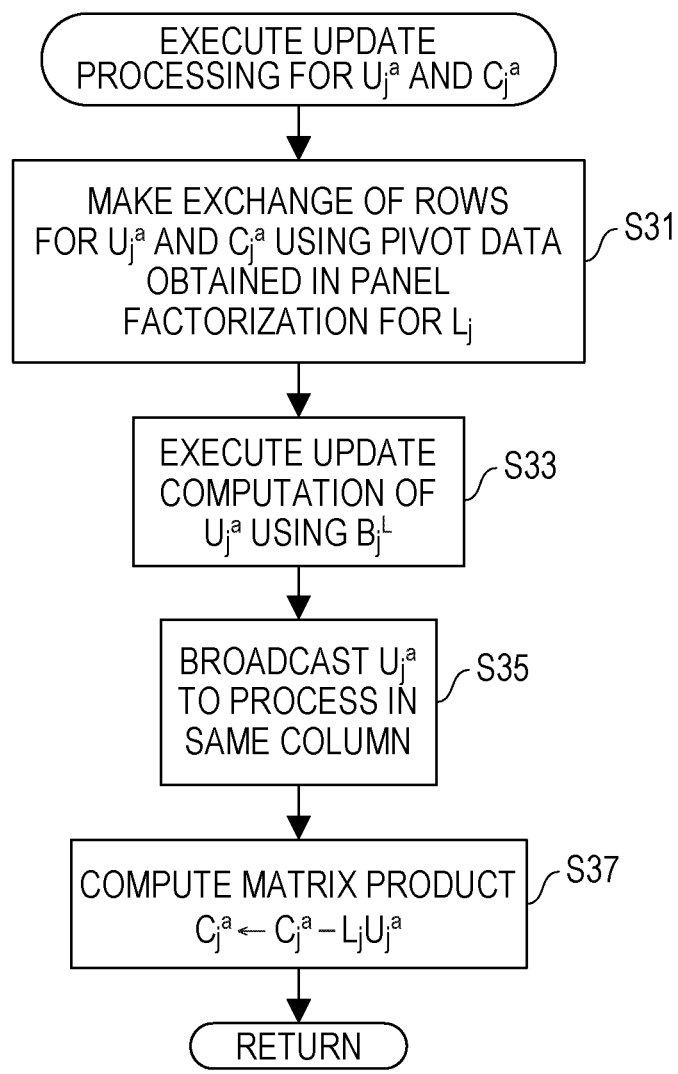
FIG. 15 is a flowchart illustrating update processing for $U_j^a$ and $C_j^a$.
Figure 16:
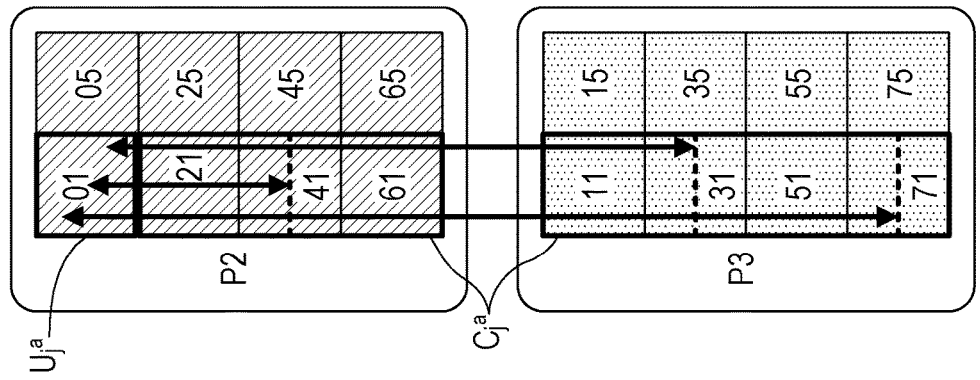
FIGS. 16A-16D are diagrams for explaining the processing content executed by processes P2 and P3.

To begin with, processes P2 and P3 execute exchange of rows for $U_j^a$ and $C_j^a$ using the pivot data obtained in panel factorization for $L_j$ (FIG. 15: step S31). As illustrated in FIG. 16A, $U_j^a$ and parts of $C_j^a$ are arranged in process P2, and parts of $C_j^a$ are arranged in process P3. At step S31, process P2 and P3 execute exchange of rows for $U_j^a$ and $C_j^a$ while communicating with each other. This figure illustrates the case where a row (indicated by a dashed line) of each of blocks 41, 31, and 71 is to be update-processed.

Process P2 executes update computation of $U_j^a$ using $B_j$ (step S33). As illustrated in FIG. 16B, since process P2 retains $U_j^a$ (in other words, block 01), the processing in consideration is not executed in process P3.

Process P2 transmits (here, broadcasts) $U_j^a$ after the processing of step S33 to the process in the same column (step S35). In other words, process P2 transmits $U_j^a$ to process P3, as illustrated in FIG. 16C.

Processes P2 and P3 execute the matrix product $C_j^a \leftarrow C_j^a - L_j U_j^a$ based on $U_j^a$ after the processing of step S33 or the like (step S37). Then, the processing returns to that of the caller. $C_j^a$, which is updated by the processing of step S37, corresponds to the parts enclosed by the dashed lines in FIG. 16D.

Figure 17:
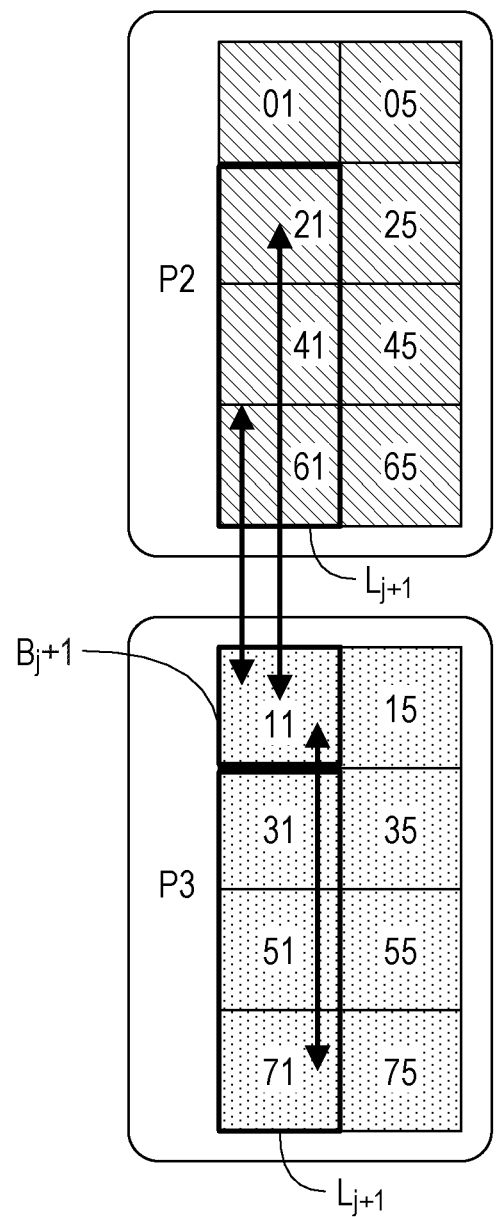
FIG. 17 is a diagram for explaining the processing content executed by processes P2 and P3.

Back to the description of FIG. 14, processes P2 and P3 execute panel factorization for $B_{j+1}$ and $L_{j+1}$ (step S11). Panel factorization is performed as described at step S3. As illustrated in FIG. 17, process P2 and process P3 execute communication for exchange of rows, and the information on the pivot row exchange is saved as the pivot data, for example. In addition, the delete processing is executed in panel factorization.

Figure 18:
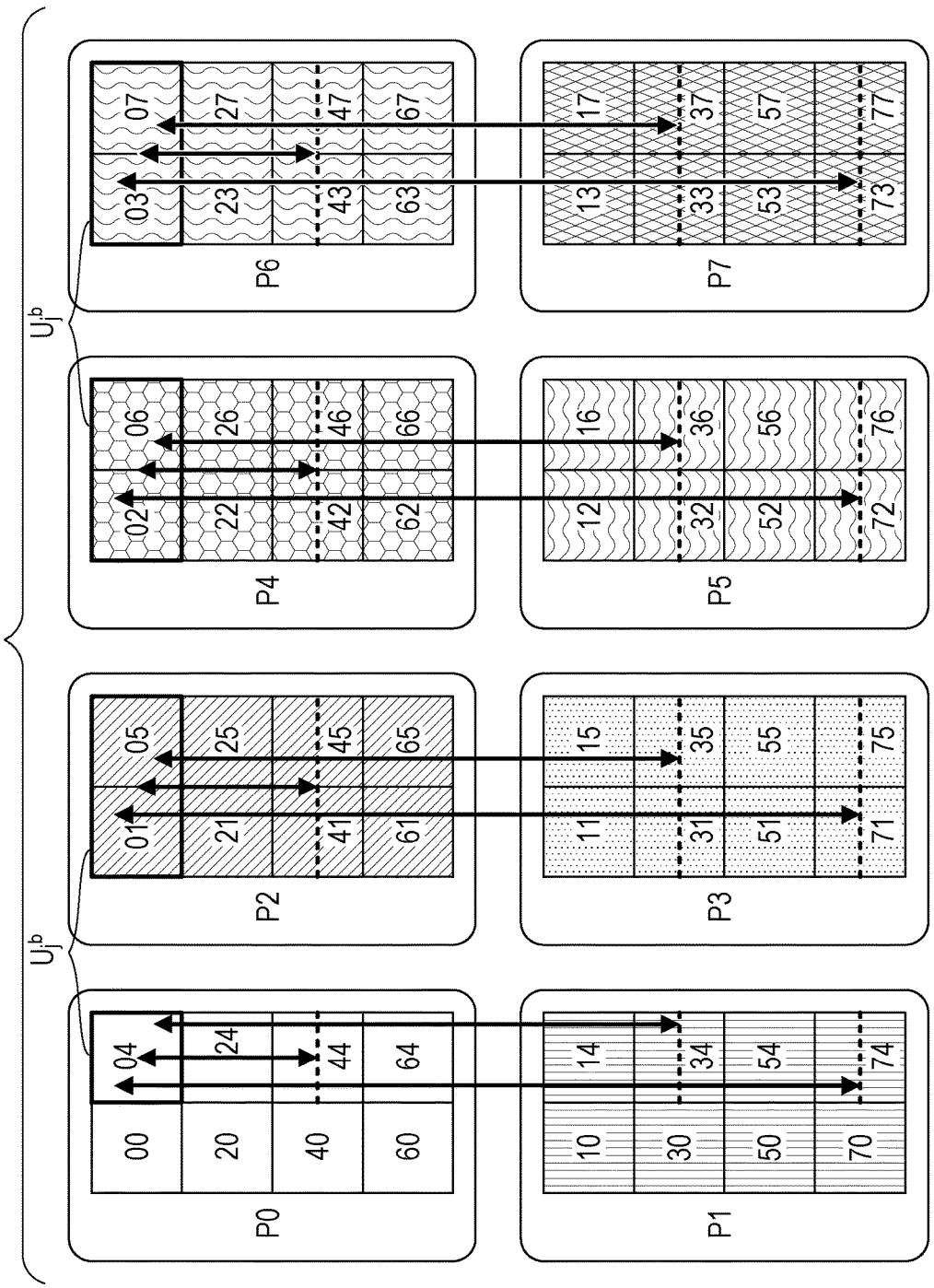
FIG. 18 is a diagram for explaining the processing content.
Figure 19:
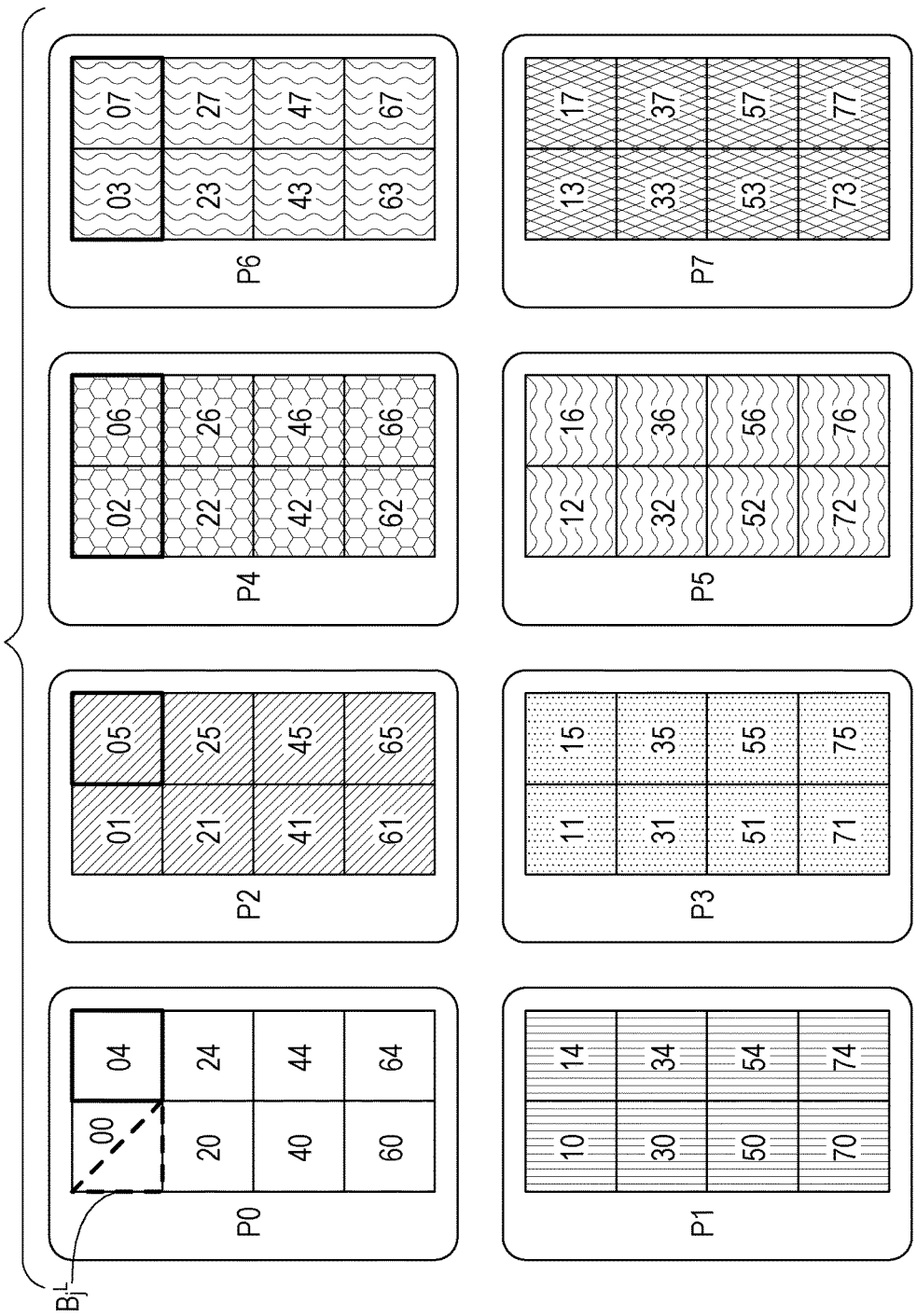
FIG. 19 is a diagram for explaining the processing content.

The processes execute exchange of rows for $U_j^b$ and $C_j^b$ using the pivot data obtained in panel factorization for $L_j$ (step S13). As illustrated in FIG. 18, for example, the parts enclosed by the bold lines correspond to $U_j^b$, and the blocks located below $U_j^b$ correspond to $C_j^b$. At step S13, processes P0 and P1 execute exchange of rows for $U_j^b$ and $C_j^b$ while communicating with each other, processes P2 and P3 execute exchange of rows for $U_j^b$ and $C_j^b$ while communicating with each other, processes P4 and P5 execute exchange of rows for $U_j^b$ and $C_j^b$ while communicating with each other, and processes P6 and P7 execute exchange of rows for $U_j^b$ and $C_j^b$ while communicating with each other.

Process P0, process P2, process P4 and process P6 execute update computation of $U_j^b$ using $B_j^L$ (step S15). $U_j^b$ corresponds to the parts enclosed by the bold lines in FIG. 19, and $B_j^L$ corresponds to the part enclosed by the dashed lines in FIG. 19. At step S15, $B_j^L X = U_j^b$ is solved, and the original $U_j^b$ is substituted for X. Here, since $B_j^L$ is a lower triangular matrix, it suffices to perform back substitutions for the columns of $U_j^b$.

Figure 20:
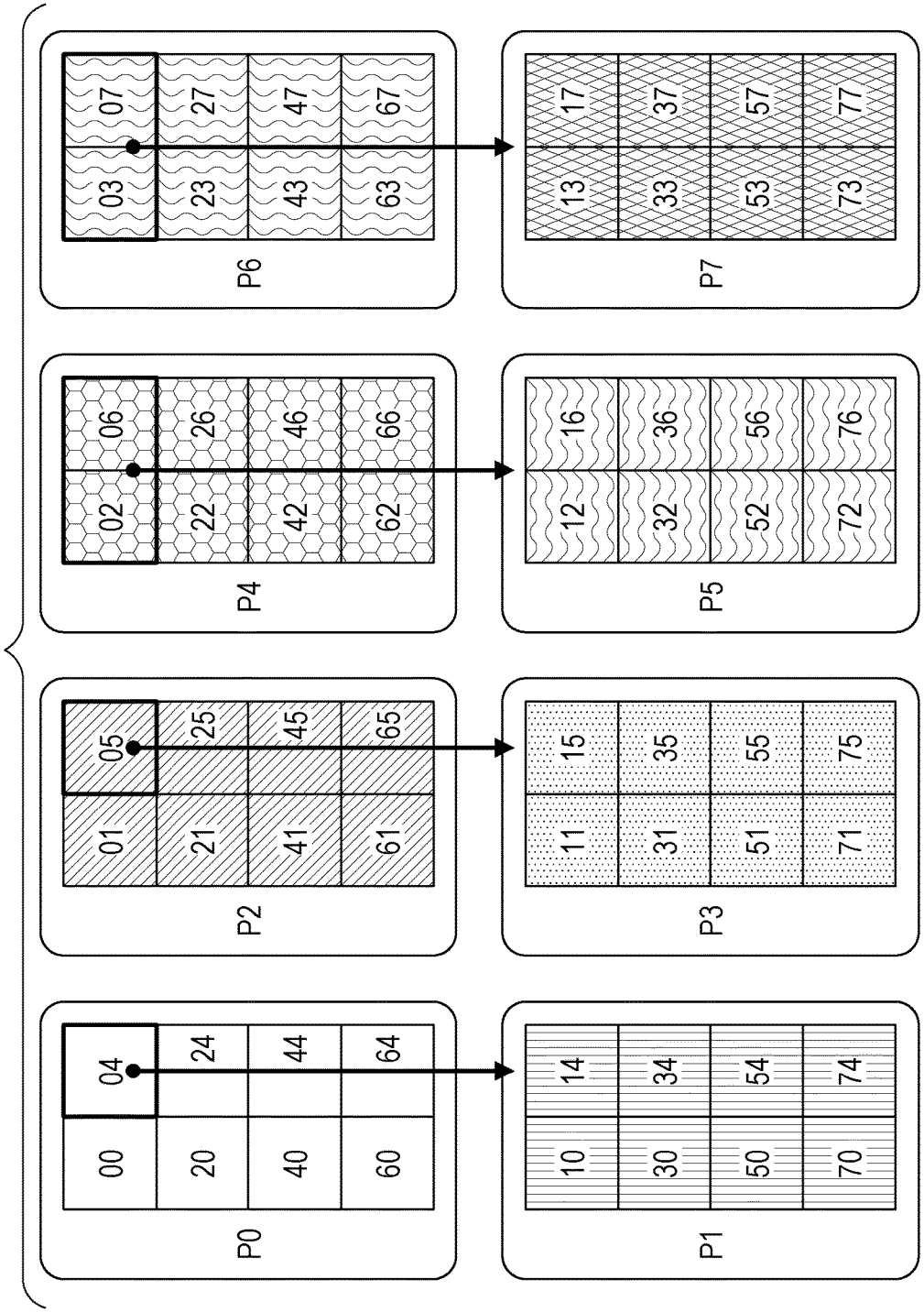
FIG. 20 is a diagram for explaining the processing content.

Process P0, process P2, process P4, and process P6 transmit (here, broadcast) $U_j^b$ after the processing of step S15 to the processes in the same columns (step S17). In other words, process P0 transmits a part of $U_j^b$ to process P1, process P2 transmits a part of $U_j^b$ to process P3, process P4 transmits parts of $U_j^b$ to process P5, and process P6 transmits parts of $U_j^b$ to process P7, as illustrated in FIG. 20.

The processes execute parallel processing of communication and computation of the matrix product $C_j^b \leftarrow C_j^b - L_j U_j^b$ (step S19). The processing at step S19 is described using FIGS. 21 to 29B. Incidentally, a technique of executing communication and matrix product computation in parallel is called look-ahead.

Figure 21:
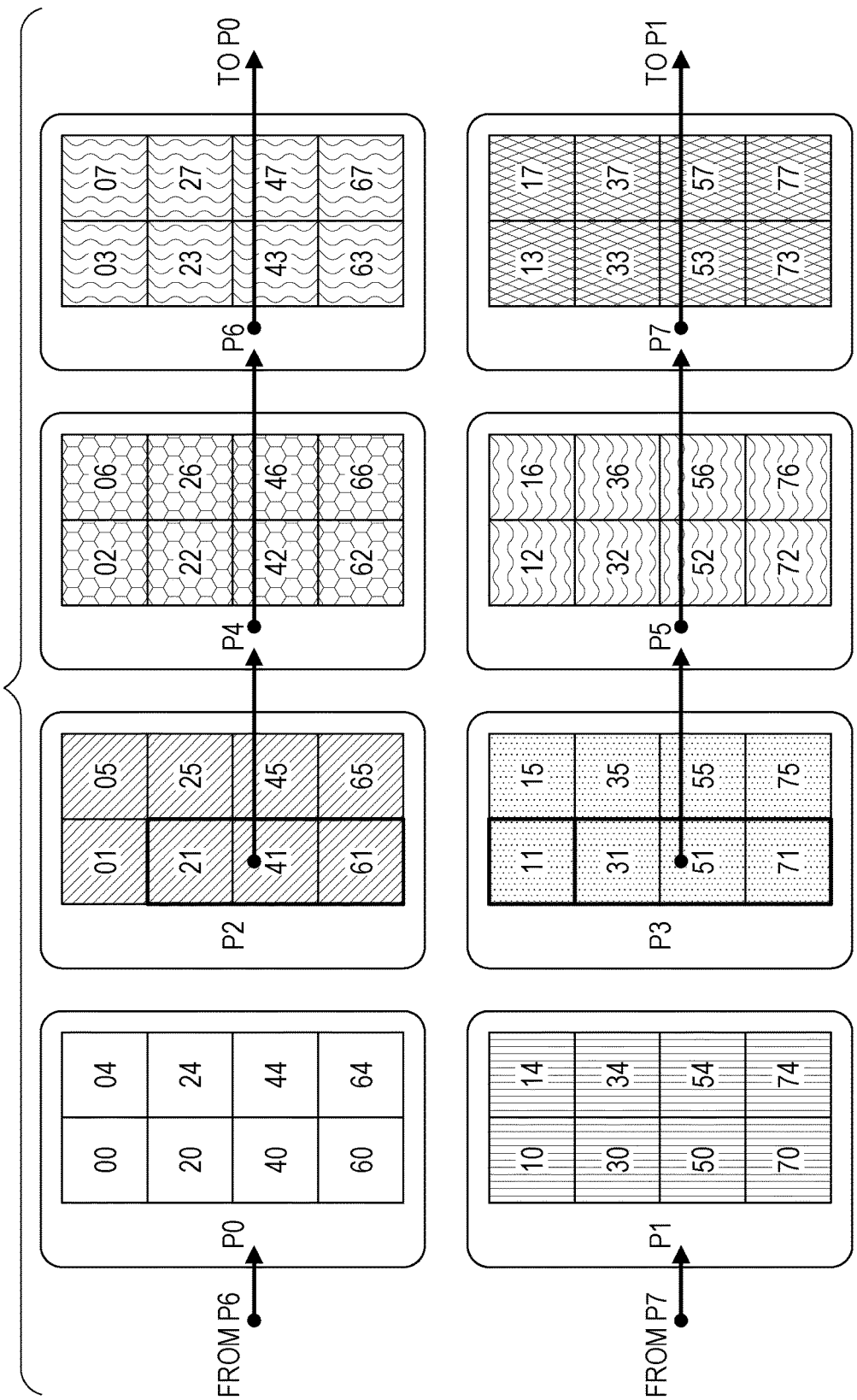
FIG. 21 is a diagram for explaining the processing content.

To begin with, communication executed at step S19 is described using FIG. 21. At step S19, processes P2 and P3 respectively transmit to process P4 and P5 $B_{j+1}$, $L_{j+1}$, and the pivot data obtained in panel factorization for $L_{j+1}$. Processes P4 and P5 transmit the data received from processes P2 and P3 to processes P6 and P7, respectively. Processes P6 and P7 transmit the data received from processes P4 and P5 to processes P0 and P1, respectively. Processes P0 and P1 receive the data from processes P6 and P7, respectively. Thus, process P0, process P2, process P4, and process P6 retain the pivot data and block 21, block 41, and block 61. Process P1, process P3, process P5, and process P7 retain the pivot data and block 11, block 31, block 51, and block 71.

Figure 22:
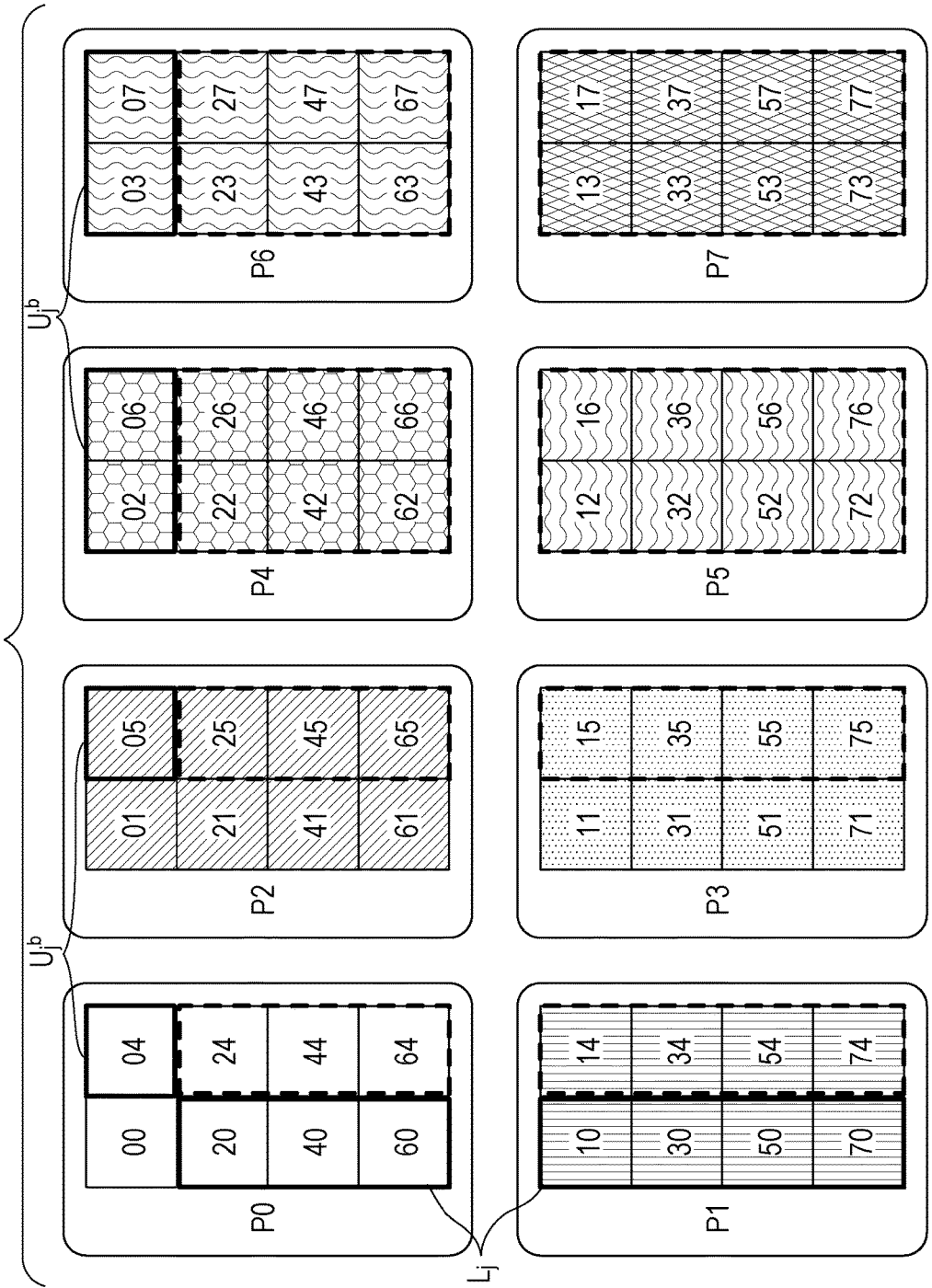
FIG. 22 is a diagram for explaining the processing content.

The matrix product executed in parallel with the communication at step S19 is described using FIG. 22. The matrix product to be executed is $C_j^b \leftarrow C_j^b - L_j U_j^b$. $U_j^b$ corresponds to block 02, block 03, block 04, block 05, block 06, and block 07 in FIG. 22, $L_j$ corresponds to block 10, block 20, block 30, block 40, block 50, block 60, and block 70 in FIG. 22, and $C_j^b$ corresponds to the parts enclosed by the dashed lines in FIG. 22.

The communication and the matrix product computation are executed in parallel with each other. The embodiment shortens the time taken until the processing of step S19 ends by altering the size of the matrix to be used for the matrix product computation. This method is described using FIGS. 23 to 29B.

Figure 23:
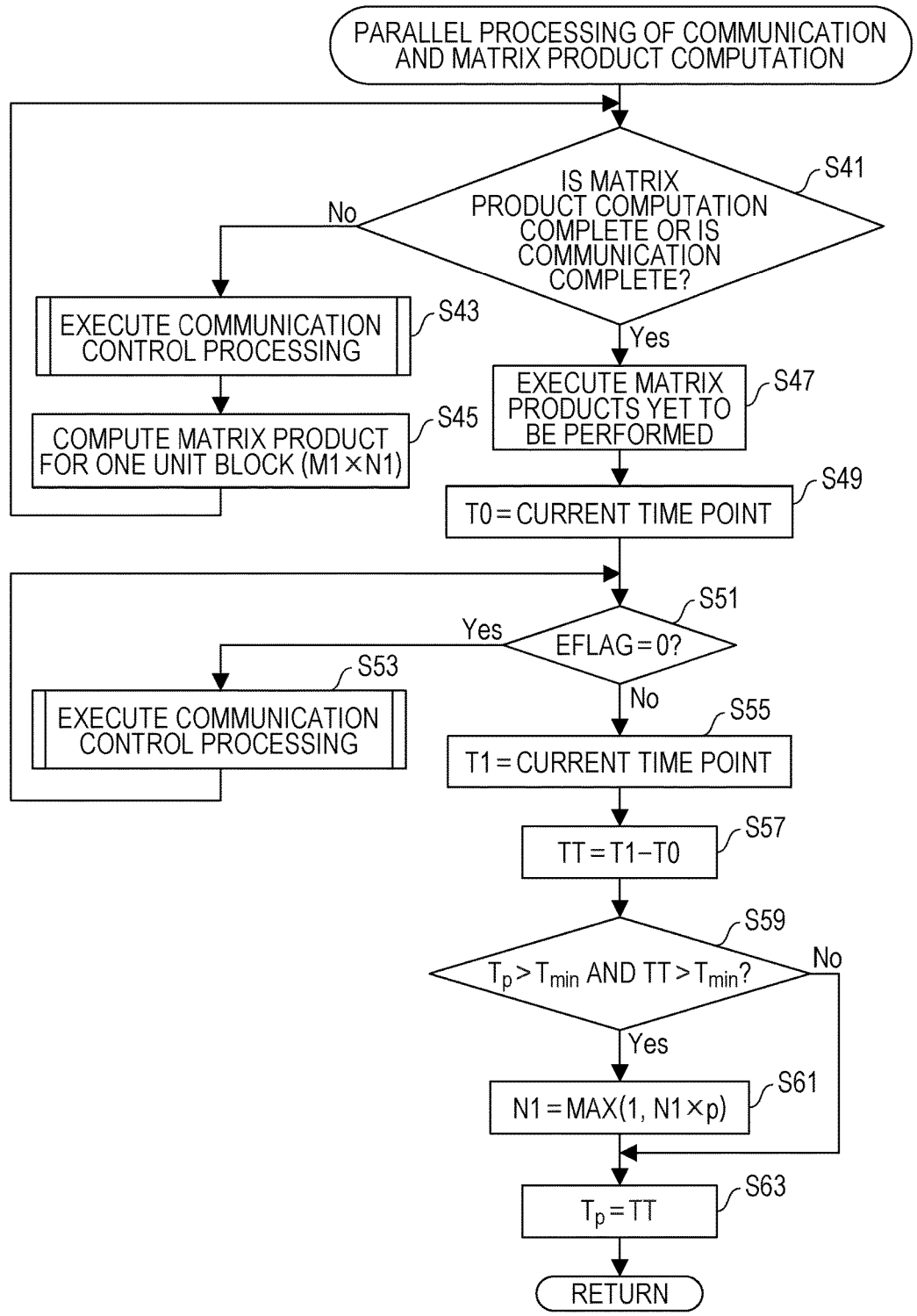
FIG. 23 is a diagram for explaining parallel processing of communication and matrix product computation.

To begin with, the computation unit 153 determines whether the matrix product computation is completed or the communication is completed (FIG. 23: step S41). In the case where neither of the matrix product computation and the communication is completed (step S41: No route), the communication control unit 154 executes communication control processing (step S43). The communication control processing is described using FIGS. 24 to 26.

Figure 24:
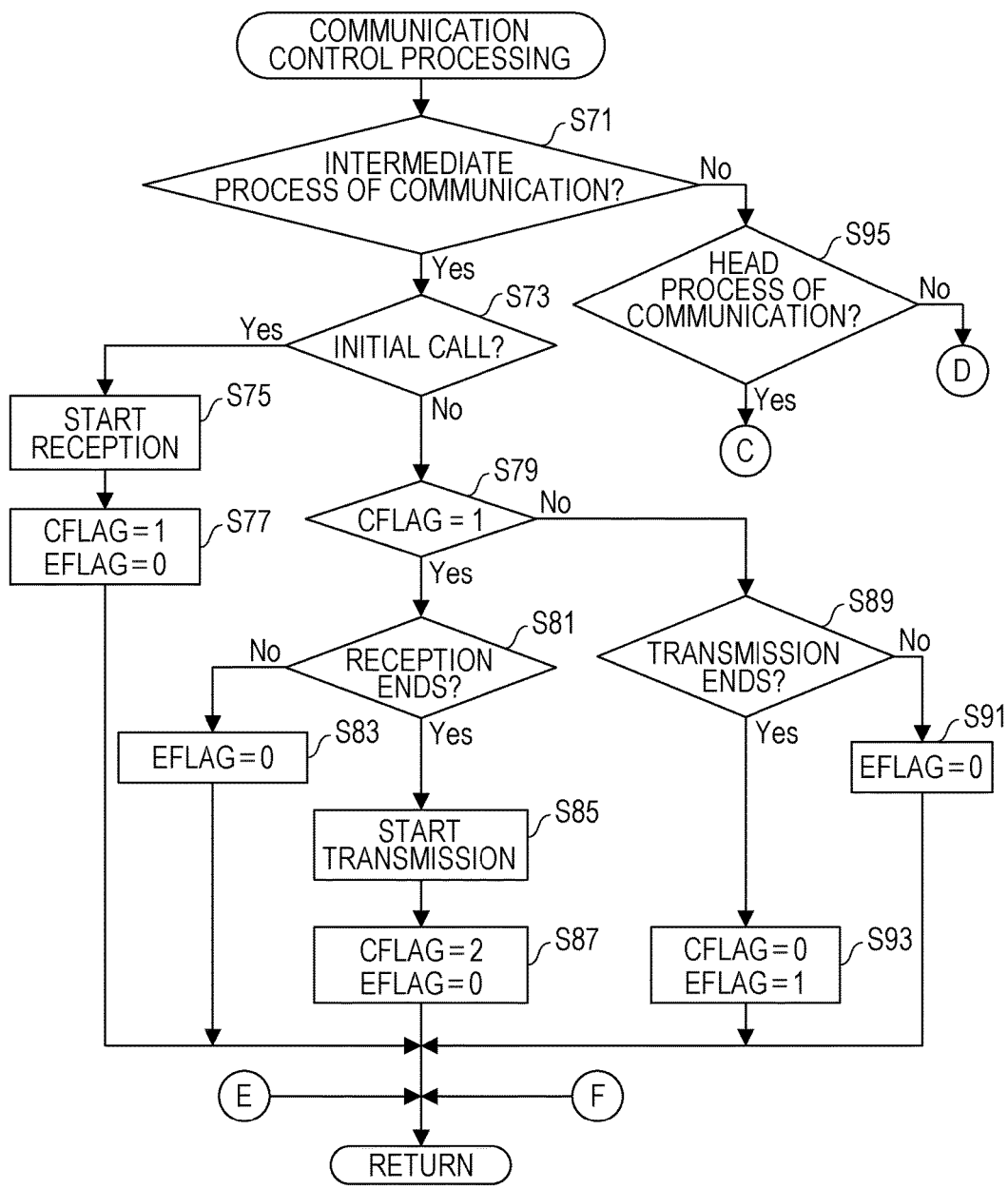
FIG. 24 is a flowchart illustrating communication control processing.

To begin with, the communication control unit 154 determines whether or not the current process is the intermediate process of the communication (FIG. 24: step S71). The intermediate process of the communication is the process of executing both transmission and reception of the $B_{j+1}$, $L_{j+1}$, and the pivot data. For example, each of process P4 to P7 is the intermediate process of the communication in the example of FIG. 21.

In the case where the current process is the intermediate process of the communication (step S71: Yes route), the communication control unit 154 determines whether or not the current call is the initial call (step S73). In the case where the current call is the initial call (step S73: Yes route), the communication control unit 154 causes the communication unit 103 to start reception by calling the communication routine MPI_Irecv in the message passing interface (MPI) being a communication library (step S75), for example. The CPU 101 is not used for a long period to control the communication because the control is immediately returned to the CPU 101 when MPI_Irecv is called. Thus, the computation unit 153 is allowed to continue the matrix product computation while waiting for the completion of the reception.

The communication control unit 154 sets CFLAG in the memory 102 such that CFLAG=1, and sets EFLAG in the memory 102 such that EFLAG=0 (step S77). Then, the processing returns to that of the caller.

CFLAG is a flag for managing the status of the communication. "CFLAG=1" is the reception state, "CFLAG=2" is the transmission state, and "CFLAG=0" is the completion of the communication.

EFLAG is a flag for notifying upper level routines of whether or not the communication is completed. "ELFAG=0" is that the communication is not completed. "ELFAG=1" is that the communication is completed.

On the other hand, in the case where the current call is not the initial call (step S73: No route), the communication control unit 154 determines whether or not CFLAG=1 (step S79).

In the case where CFLAG=1 (step S79: Yes route), the communication control unit 154 determines whether or not the reception ends (step S81). Note that when the communication routine MPI_test in the MPI is called, information is returned indicating whether or not the designated communication ends. Thus, whether or not the reception ends is checked. The CPU 101 is not used for a long period to control the communication because the control for MPI_test is immediately returned to the CPU 101, as in the case of MPI_Irecv.

In the case where the reception does not end (step S81: No route), the communication control unit 154 sets EFLAG in the memory 102 such that EFLAG=0 (step S83), and returns to the processing of the caller.

On the other hand, in the case where the reception ends (step S81: Yes route), the communication control unit 154 causes the communication unit 103 to start transmission by calling communication routine MPI_Isend in the MPI (step S85). The CPU 101 is not used for a long period to control the communication because the control for MPI_Isend is immediately returned to the CPU 101, as in the cases of MPI_Irecv and MPI_test. Thus, the computation unit 153 is allowed to continue the matrix product computation while waiting for the completion of the transmission.

The communication control unit 154 sets CFLAG in the memory 102 such that CFLAG=2, and sets EFLAG in the memory 102 such that EFLAG=0 (step S87). Then the processing returns to that of the caller.

On the other hand, in the case where CFLAG=0 (step S79: No route), the communication control unit 154 determines whether or not the transmission ends (step S89). Note that when the communication routine MPI_test in the MPI is called, information is returned indicating whether or not the designated communication ends. Thus, whether or not the transmission ends is checked.

In the case where the transmission does not end (step S89: No route), the communication control unit 154 sets EFLAG in the memory 102 such that EFLAG=0 (step S91), and returns to the processing of the caller.

On the other hand, in the case where the transmission ends (step S89: Yes route), the communication control unit 154 sets CFLAG in the memory 102 such that CFLAG=0, and sets EFLAG in the memory 102 such that EFLAG=1 (step S93). Then, the processing returns to that of the caller.

In the case where the current process is not the intermediate process of the communication (step S71: No route), the communication control unit 154 determines whether or not the current process is the head process of the communication (step S95). The head process of the communication is a process of executing only transmission of $B_{j+1}$, $L_{j+1}$, and the pivot data. For example, each of processes P2 and P3 is the head process of the communication in the example of FIG. 21.

In the case where the current process is the head process of the communication (step S95: Yes route), the processing moves on to the processing of step S97 in FIG. 25 via terminal C. On the other hand, in the case where the current process is not the head process of the communication (step S95: No route), the processing moves on to the processing of step S111 in FIG. 26 via terminal D.

Figure 25:
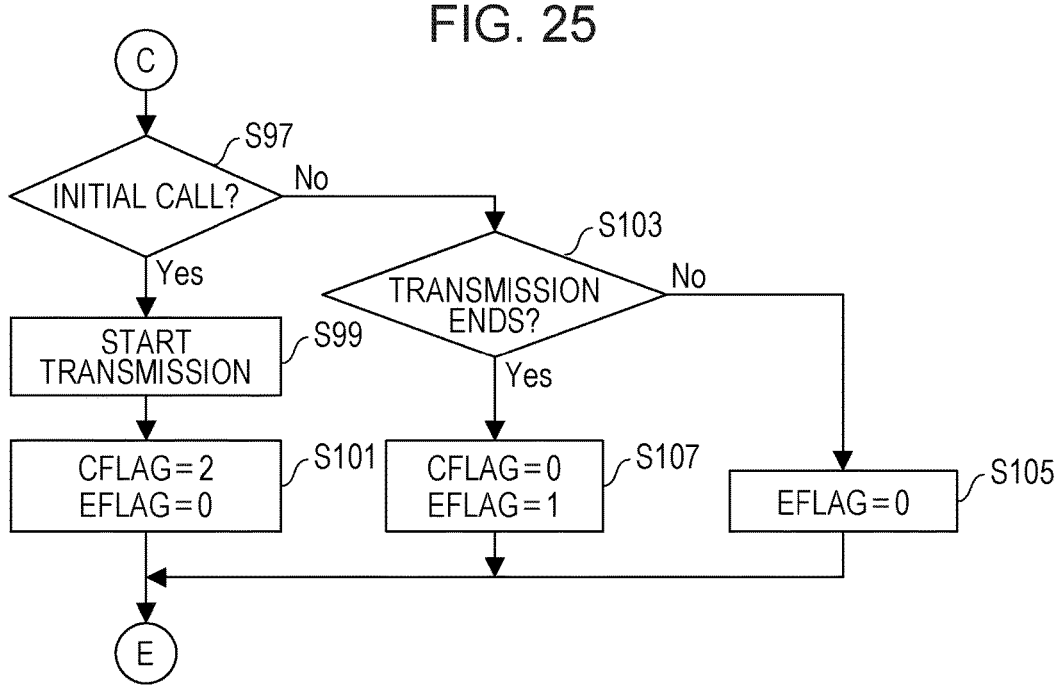
FIG. 25 is a flowchart illustrating the communication control processing.

The processing following terminal C is described. The communication control unit 154 determines whether or not current call is the initial call (FIG. 25: step S97). In the case where the current call is the initial call (step S97: Yes route), the communication control unit 154 causes the communication unit 103 to start transmission by calling the communication routine MPI_Isend in the MPI (step S99), for example. The CPU 101 is not used for a long period to control the communication because the control is immediately returned to the CPU 101 when MPI_Isend is called. Thus, the computation unit 153 is allowed to continue the matrix product computation while waiting for the completion of the transmission.

The communication control unit 154 sets CFLAG in the memory 102 such that CFLAG=2, and sets EFLAG in the memory 102 such that EFLAG=0 (step S101). Then, the processing returns to the processing of the caller via terminal E.

On the other hand, in the case where the current call is not the initial call (step S97: No route), the communication control unit 154 determines whether or not the transmission ends (step S103). Note that when the communication routine MPI_test in the MPI is called, information is returned indicating whether or not the designated communication ends. Thus, whether or not the transmission ends is checked.

In the case where the transmission does not end (step S103: No route), the communication control unit 154 sets EFLAG in the memory 102 such that EFLAG=0 (step S105), and the processing returns to the processing of the caller via terminal E.

On the other hand, in the case where the transmission ends (step S103: Yes route), the communication control unit 154 sets CFLAG in the memory 102 such that CFLAG=0, and sets EFLAG in the memory 102 such that EFLAG=1 (step S107). Then, the processing returns to the processing of the caller via terminal E.

Figure 26:
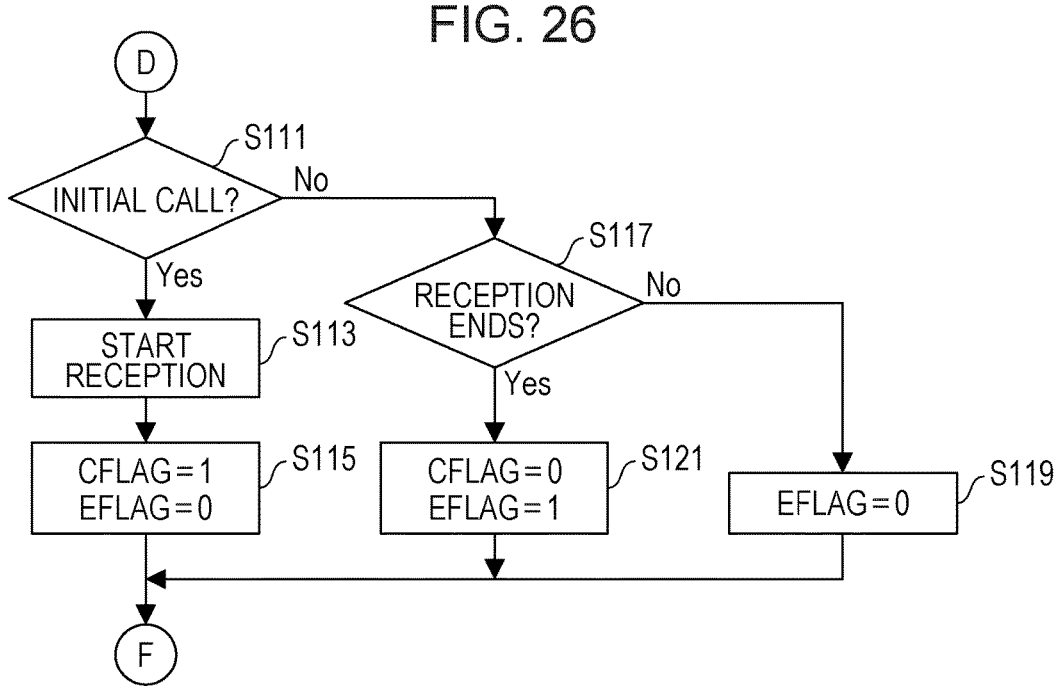
FIG. 26 is a flowchart illustrating the communication control processing.

The processing following terminal D is described. The communication control unit 154 determines whether or not current call is the initial call (FIG. 26: step S111). In the case where the current call is the initial call (step S111: Yes route), the communication control unit 154 causes the communication unit 103 to start reception by calling the communication routine MPI_Irecv in the MPI (step S113), for example. The CPU 101 is not used for a long period to control the communication because the control is immediately returned to the CPU 101 when MPI_Irecv is called. Thus, the computation unit 153 is allowed to continue the matrix product computation while waiting for the completion of the reception.

The communication control unit 154 sets CFLAG in the memory 102 such that CFLAG=1, and sets EFLAG in the memory 102 such that EFLAG=0 (step S115). Then, the processing returns to the processing of the caller via terminal F.

On the other hand, in the case where the current call is not the initial call (step S111: No route), the communication control unit 154 determines whether or not the reception ends (step S117). Note that when the communication routine MPI_test in the MPI is called, information is returned indicating whether or not the designated communication ends. Thus, whether or not the reception ends is checked.

In the case where the reception does not end (step S117: No route), the communication control unit 154 sets EFLAG in the memory 102 such that EFLAG=0 (step S119), and the processing returns to the processing of the caller via terminal F.

On the other hand, in the case where the reception ends (step S117: Yes route), the communication control unit 154 sets CFLAG in the memory 102 such that CFLAG=0, and sets EFLAG in the memory 102 such that EFLAG=1 (step S121). Then, the processing returns to the processing of the caller via terminal F.

The above processing controls the communication between the processes. Note that since the communication unit 103 transfers actual data (for example, the elements of a matrix), the CPU 101 is allowed to concentrate on computation while the communication unit 103 is performing communication, except during a little time taken to control the communication.

Back to the description of FIG. 23, the computation unit 153 computes the matrix product for one unit block (M1× N1) (step S45). Then, the processing returns to that of step S41.

Figure 27:
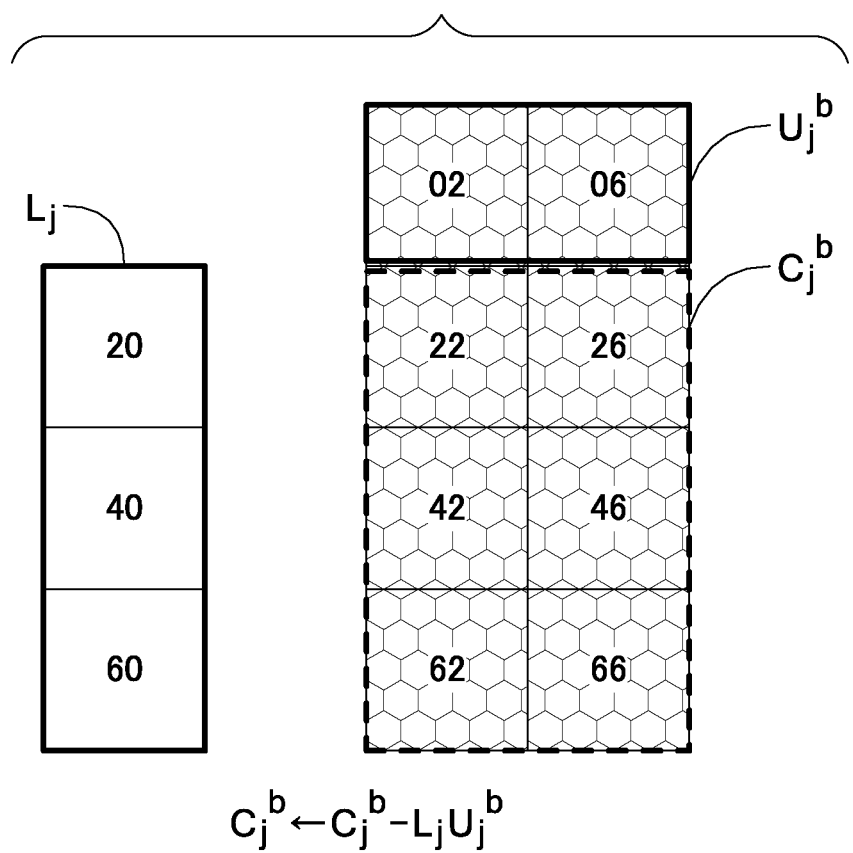
FIG. 27 is a diagram illustrating an example of the matrix product.

Consider the example of executing the matrix product as illustrated in FIG. 27, for example. In this case, since each of block 22, block 42, block 62, block 26, block 46, and block 66 is the unit block, the matrix product is executed in six steps, as illustrated in FIGS. 28A and 28B. To put it differently, the matrix product $C_j^{22} \leftarrow C_j^{22} - L_j^{20} U_j^{02}$, the matrix product $C_j^{42} \leftarrow C_j^{42} - L_j^{40} U_j^{02}$, the matrix product $C_j^{62} \leftarrow C_j^{62} - L_j^{60} U_j^{02}$, the matrix product $C_j^{26} \leftarrow C_j^{26} - L_j^{20} U_j^{06}$, the matrix product $C_j^{46} \leftarrow C_j^{46} - L_j^{40} U_j^{06}$, and the matrix product $C_j^{66} \leftarrow C_j^{66} - L_j^{60} U_j^{06}$ are executed. Here, each of the superscript numbers indicates a block number.

On the other hand, in the case where the matrix product computation or the communication is completed (step S41: Yes route), the computation unit 153 executes matrix products yet to be executed (step S47). In the case where there are no matrix products yet to be executed, the processing of step S47 is skipped. Note that the case where there are matrix products yet to be executed is the case where the communication is completed earlier than the matrix product computation.

The measurement unit 151 sets the current time point in a variable T0 (step S49). Note that step S49 may be skipped in the case where the processing of step S47 is executed because the communication is completed earlier than the matrix product computation.

The communication control unit 154 determines whether or not EFLAG=0 (step S51). In the case where EFLAG=0 (step S51: Yes route), the communication control unit 154 executes the communication control processing (step S53). Since the communication control processing is described above, the description thereof is omitted here.

On the other hand, in the case where EFLAG=0 is not satisfied (step S51: No route), the communication is completed. Thus, measurement unit 151 sets the current time point in a variable T1 (step S55). Note that step 55 may be skipped in the case where the processing of step S47 is executed because the communication is completed earlier than the matrix product computation.

The measurement unit 151 computes a time TT from when the matrix products are completed to when the communication is completed (in other words, the wait time of the CPU 101) by using TT=T1−T0 (step S57).

The alteration unit 152 determines whether or not both of $T_p > T_{min}$ and $TT > T_{min}$ are satisfied (step S59). $T_p$ is the previous TT, and in the case of the initial processing, it is determined that $T_p > T_{min}$ is not satisfied. $T_{min}$ is a predetermined time and is set by an operator.

In the case where $T_p > T_{min}$ or $TT > T_{min}$ is not satisfied (step S59: No route), the processing moves on to that of step S63. On the other hand, both of $T_p > T_{min}$ and $TT > T_{min}$ are satisfied (step S59: Yes route), the alteration unit 152 sets the size N1 of a unit block in the row direction such that N1=MAX (1, N1×p) (step S61). MAX(1, N1×p) is a function which returns the greater value of 1 and N1×p. The value p is a predetermined proportion and approximately ranges from 0.5 to 0.8, for example. Although N1 is made small here, M1 may be made small in the case where the computational performance enhances for small M1.

Note that, by checking not only the condition for TT but also the condition for $T_p$, it is possible to reduce the risk of making the size of the unit block small by mistake when TT is temporarily long for a reason.

The measurement unit 151 sets $T_p$ such that $T_p$=TT (step S63). Then, the processing returns to that of the caller.

Back to the description of FIG. 14, each of the processes increments j by one (step S21), and determines whether or not j>(number of blocks in the row direction−1) is satisfied (step S23). The number of blocks in the row direction is the number of blocks each having the width NB in the row direction (in other words, the right-left direction) of matrix A. In the case where j>(number of blocks in the row direction−1) is not satisfied (step S23: No route), the processing returns to that of step S9. On the other hand, in the case where j>(number of blocks in the row direction−1) is satisfied (step S23: Yes route), the processing ends.

Consider the case where the size of the matrix product in the row direction illustrated in FIG. 27 is reduced to half by the processing of step S61, for example. In this case, the result obtained by three matrix products illustrated in FIG. 28A may be obtained by six matrix products illustrated in FIG. 29A, and the result obtained by three matrix products illustrated in FIG. 28B may be obtained by six matrix products illustrated in FIG. 29B. In FIGS. 29A and 29B, each of the numbers in the superscript parentheses is a block number in an NB×NB block. For example, $C_j^{22(1)}$ represents the left half block of $C_j^{22}$, and $C_j^{22(2)}$ represents the right half block of $C_j^{22}$.

When the number of executions of matrix products is increased, it is possible to perform more frequently the communication control processing (step S43) executed each time one matrix product ends. This makes it possible to shorten the wait time from when the matrix product is completed to when the communication is completed because the communication proceeds without any stop.

In the computation of LU-factorization as illustrated in FIG. 7, the size of the matrix used for the matrix product computation becomes smaller as the processing proceeds. Thus, the balance between the computation and the communication changes.

In the case of executing in parallel the communication and the matrix products, the size of the entire matrix is large at earlier stages of the processing (in other words, when j is relatively small). For this reason, the number of unit blocks to be computed by one process is sufficiently large even when the block sizes M1 and N1 are set relatively large, enabling the execution of all communications in the background of the matrix product computation. Thus, the CPU 101 does not have to wait for the completion of the communication.

Figure 30:
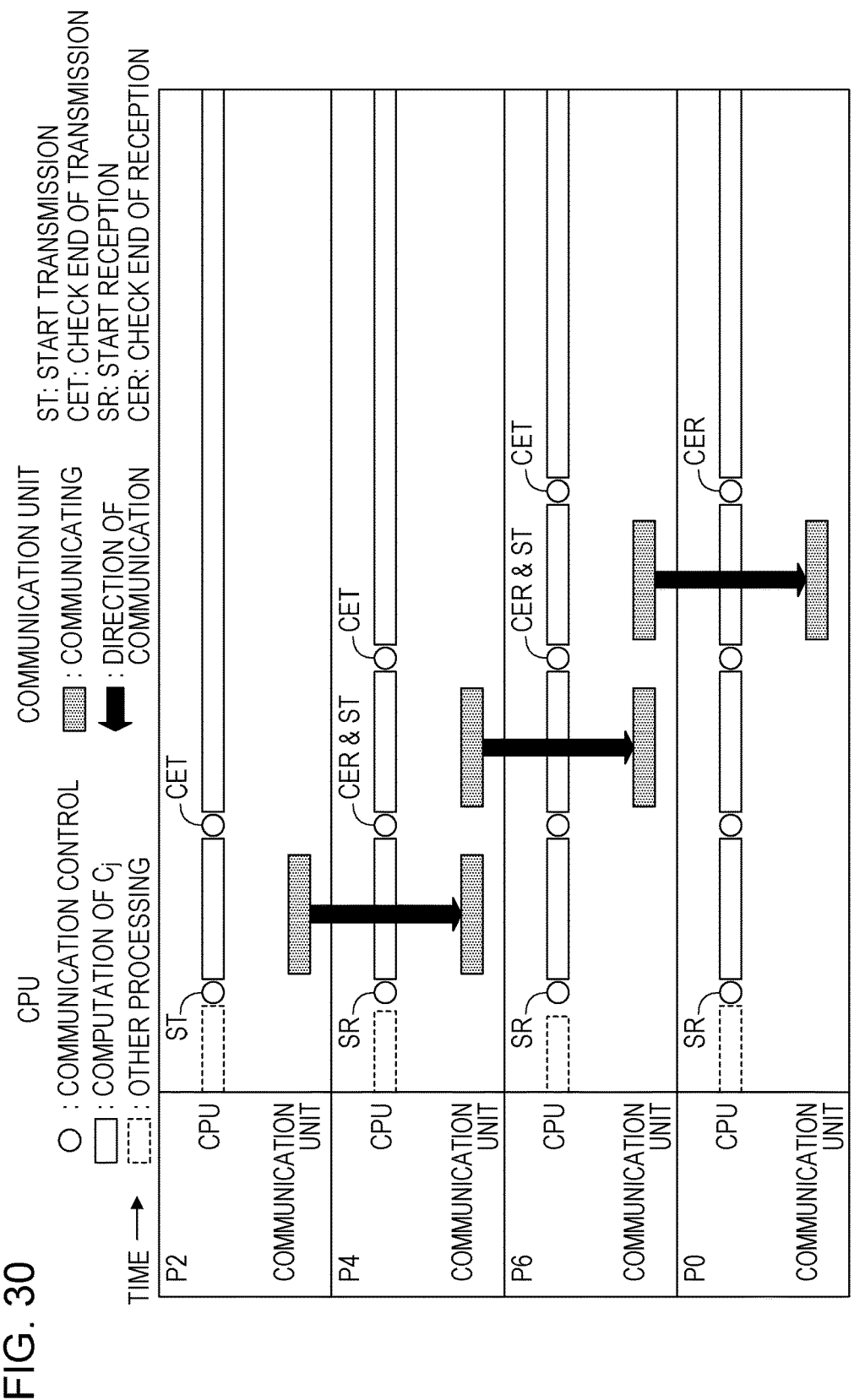
FIG. 30 is a diagram for explaining shortening of a wait time.

FIG. 30 illustrates an example of the case where the wait time of the CPU 101 is not produced. FIG. 30 illustrates the communications performed by P2, P4, P6, and P0, which are illustrated in FIG. 21. The operation is described taking P6 as an example. To begin with, the CPU 101 instructs the communication unit 103 to start reception, and executes a matrix product. After the completion of the matrix product for one unit block, the CPU 101 checks the end of the reception. Since the communication is not completed yet, however, the CPU 101 executes the matrix product for the next unit block. The CPU 101 checks the end of the reception after the completion of the matrix product. Since the reception is ended, the CPU 101 instructs a transmission to the next node and executes the next matrix product. The CPU 101 checks the end of the transmission after the completion of the matrix product. Since the transmission is ended, the CPU 101 executes the computation of the remaining matrix products.

On the other hand, the size of the entire matrix is small at later stages of the processing (in other words, when j is relatively large). For this reason, the number of unit blocks the matrix products of which are to be computed is small, and the matrix product computation of all the unit blocks is completed before the completion of the communication. At this moment, it is impossible to execute the next matrix product without the data received during the communication. The CPU 101 is only allowed to start computation after the communication is completed. Thus, the CPU 101 has to wait for the completion of the communication.

Figure 31:
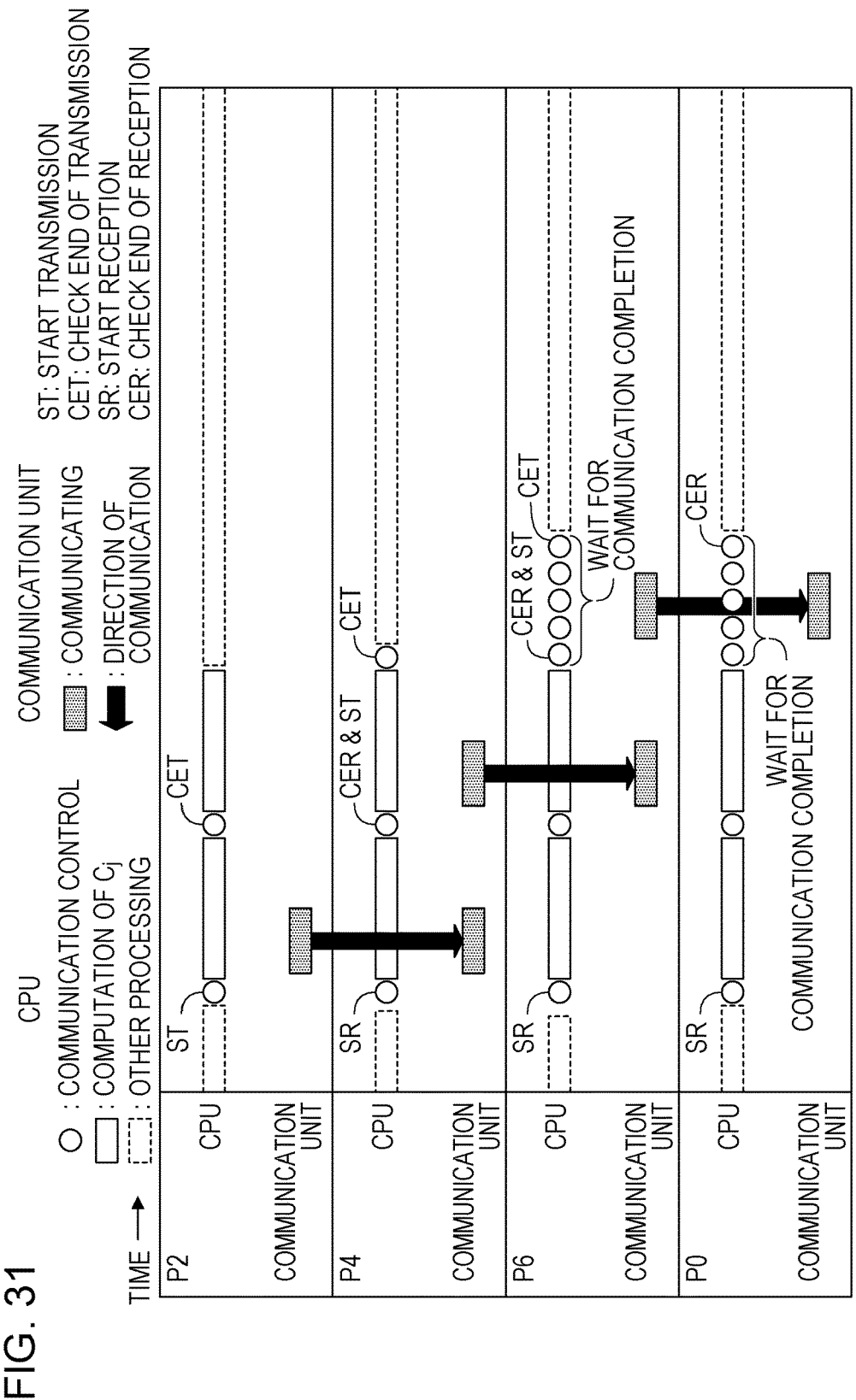
FIG. 31 is a diagram for explaining the shortening of the wait time.

FIG. 31 illustrates an example of the case where wait time of the CPU 101 is produced. The operation is described taking P6 as an example. In FIG. 31, there are only two unit blocks for the matrix products to be computed by P6. To begin with, the CPU 101 instructs the communication unit 103 to start reception, and executes a matrix product. After the completion of the matrix product for one unit block, the CPU 101 checks the end of the reception. Since the communication is not completed yet, however, the CPU 101 executes the matrix product for the next unit block. The CPU 101 checks the end of the reception after the completion of the matrix product. Since the reception is completed, the CPU 101 instructs a transmission to the next node. Here, there is no unit block to be used for the next matrix product computation and the CPU 101 has nothing to compute. Thus, the CPU 101 has to wait for the completion of the communication.

In a large scale system in particular, the number of nodes between the head node and the terminal node is large. Thus, the time period for which the CPU 101 waits for the completion of the communication becomes long. When the block size is made small, the communication control processing is more frequently executed, making it possible to reduce the wait time until the completion of the communication. However, the matrix product computation has a characteristic that its computational efficiency enhances as the matrix becomes larger in size. Thus, since the matrix product computation time becomes long in the case where the size of the unit block is simply made small, it is impossible to shorten the processing time of the entire LU-factorization.

Figure 32:
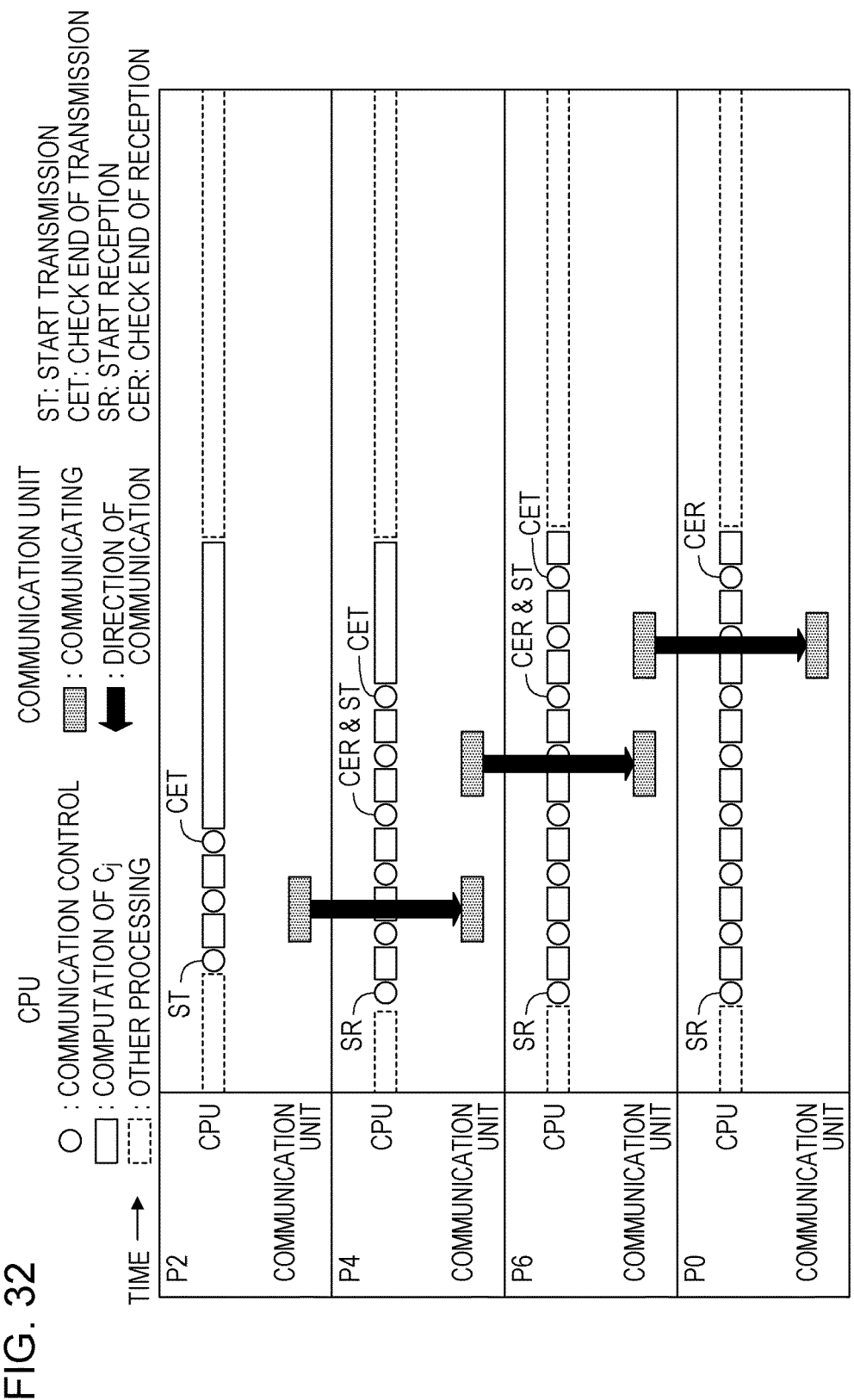
FIG. 32 is a diagram for explaining the shortening of the wait time.

In order to deal with the above-mentioned problem, the embodiment reduces the size of the unit block when the wait time actually produced becomes longer than $T_{min}$. To be more specific, at later stages of LU-factorization, the matrix product computation is executed using relatively small unit blocks as illustrated in FIG. 32. On the other hand, at earlier stages of LU-factorization where the wait time is not produced, matrix products are executed using relatively large unit blocks. Thus, it is possible to execute matrix products without deteriorating computational efficiency. This shortens the processing time of LU-factorization as a whole.

The embodiment of the present disclosure has been described above. However, the present disclosure is not limited to this. For example, the configuration of the functional blocks of nodes n0 to n7 described above might not be the same as the actual configuration of program modules.

In addition, in the processing flowcharts, the processing may be reordered as long as the processing results remain unchanged. Furthermore, the processing may be executed in parallel.

The embodiment of the present disclosure described above is summarized as follows.

A parallel computer according to a first aspect of the embodiment includes: (A) multiple processing units which execute LU-factorization in parallel. In addition, each of the multiple processing units includes: (a1) a measurement unit which measures a first time period, which is a time period from when a matrix product for a matrix of a first size is completed to when communication with a different processing unit out of the multiple processing units is completed, and (a2) an alteration unit which alters a size of the matrix to be used for the matrix product to a second size smaller than the first size in a case where the first time period measured by the measurement unit is equal to or longer than a predetermined time period.

When the size of a matrix to be used for a matrix product is reduced, time taken by one matrix product is shortened. Thus, the communication control performed at the completion of one matrix product may be frequently performed. This makes it possible to complete the communication earlier, leading to the shortening of the first time period. As a result, the processing time of LU-factorization may be shortened.

In addition, each of the multiple processing units may include: (a3) a computation unit which executes the matrix product; (a4) a communication unit which executes the communication with the different processing unit in parallel with the matrix product by the computation unit; and (a5) a communication control unit which executes processing of continuing progress of the communication by the communication unit each time the matrix product by the computation unit ends. This makes it possible to reduce the risk of stopping the progress of the communication. Also, since the communication time is concealed, it is possible to shorten the processing time of LU-factorization.

Moreover, the communication with the different processing unit may include at least one of communication to receive a matrix to be used for a next matrix product and pivot data obtained in panel factorization for the matrix from the different processing unit and communication to transmit the matrix to be used for the next matrix product and the pivot data obtained in the panel factorization for the matrix to the different processing unit. This makes it possible to start the next matrix product promptly.

Furthermore, the alteration unit described above may (a21) alter the size of the matrix from the first size to the second size by making smaller at least one of a size in a row direction and a size in a column direction. This makes it possible to execute the matrix product in such a manner as to shorten the processing time.

What is more, (a11) after measuring the first time period, the measurement unit described above may further measure a second time period, which is a time period from when computation of a next matrix product is completed using the matrix of the first size to when the communication with the different processing unit is completed. Meanwhile, the alteration unit described above may (a22) alter the size of the matrix to be used for the matrix product to the second size smaller than the first size in a case where the first time period measured by the measurement unit is equal to or longer than the predetermined time period and the second time period measured by the measurement unit is equal to or longer than the predetermined time period. This makes it possible to reduce the risk of making the size of a matrix small by mistake in the case where the first time period is temporarily long for a reason.

A parallel LU-factorization method according to a second aspect of the embodiment is executed in a parallel computer including multiple processing units which execute LU-factorization in parallel. Additionally, the parallel LU-factorization method includes processing in which each of the multiple processing units (B) measures a first time period, which is a time period from when a matrix product for a matrix of a first size is completed to when communication with a different processing unit out of the plurality of processing units is completed, and (C) alters a size of the matrix to be used for the matrix product to a second size smaller than the first size in a case where the measured first time period is equal to or longer than a predetermined time period.

Note that it is possible to create a program for causing a processor to perform the processing in accordance with the above-described method. For example, the program is stored in a computer-readable storage medium or storage device such as a flexible disk, a CD-ROM, a magneto-optical disk, a semiconductor memory, or a hard disk. Incidentally, an intermediate processing result is temporarily preserved in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A parallel computer comprising:
   a plurality of processing nodes coupled to an interconnect to exchange data, the plurality of processing nodes configured to execute LU-factorization in parallel on a matrix, wherein the matrix is divided into portions and the portions are allocated to the nodes, respectively, and wherein each of the plurality of processing nodes includes:
   a memory; and
   a processor coupled to the memory and configured to execute a process, the process including:
   measuring a first time period, which is a time period from when the matrix product for the allocated portion of the matrix of a first size is completed to when communication with a different processing node out of the plurality of processing nodes is completed,
   altering a size of the allocated portion of the matrix to be used to execute the matrix product to a second size smaller than the first size in a case where the measured first time period is equal to or longer than a predetermined time period, and
   executing a matrix product computation on the altered allocated portion of the matrix.

2. The parallel computer according to claim 1, wherein the communication with the different processing node is caused at each time the execution of the matrix product completes, and is carried out in parallel with an execution of a next matrix product.

3. The parallel computer according to claim 1, wherein the communication with the different processing node includes at least one of
   communication for receiving a next matrix to be used for a next matrix product and pivot data obtained in panel factorization for the next matrix from the different processing node and
   communication for transmitting a matrix to be used for a next matrix product in the different processing node and the pivot data obtained in the panel factorization for the next matrix to the different processing node.

4. The parallel computer according to claim 1, wherein in the altering, the size of the allocated portion of the matrix is altered from the first size to the second size by reducing at least one of a size in a row direction and a size in a column direction.

5. The parallel computer according to claim 1, wherein in the measuring, after measuring the first time period, further measuring a second time period, which is a time period from when computation of a next matrix product is completed using the allocated portion of the matrix of the first size to when communication with the different processing node is completed, and
   in the altering, the size of the allocated portion of the matrix to be used for the matrix product is altered to the second size in a case where the first time period measured by the measurement node is equal to or longer than the predetermined time period and the second time period measured by the measurement node is equal to or longer than the predetermined time period.

6. A parallel LU-factorization method executed in a parallel computer including a plurality of processing nodes coupled to an interconnect to exchange data, the plurality of processing nodes configured to execute LU-factorization in parallel on a matrix, wherein the matrix is divided into portions and the portions are allocated to the nodes, respectively, and the method comprising causing each of the plurality of processing nodes to execute processing of:
   measuring a first time period, which is a time period from when the matrix product for the allocated portion of the matrix of a first size is completed to when communication with a different processing node out of the plurality of processing nodes is completed;

altering a size of the allocated portion of the matrix to be used to execute the matrix product to a second size smaller than the first size in a case where the measured first time period is equal to or longer than a predetermined time period, and executing a matrix product computation on the altered allocated portion of the matrix.

7. A non-transitory computer-readable recording medium storing a parallel LU-factorization program for a plurality of processing nodes coupled to an interconnect to exchange data, the plurality of processing nodes configured to execute LU-factorization in parallel on a matrix, wherein the matrix is divided into portions and the portions are allocated to the nodes, respectively, the parallel LU-factorization program causing a processor to execute processing of measuring a first time period, which is a time period from when the matrix product for the allocated portion of a matrix of a first size is completed to when communication with a different processor is completed, altering a size of the allocated portion of the matrix to be used to execute the matrix product to a second size smaller than the first size in a case where the measured first time period is equal to or longer than a predetermined time period, and executing a matrix product computation on the altered allocated portion of the matrix.

* * * * *